Sept. 4, 1951  J. C. CABLE  2,566,312
CELESTIAL NAVIGATION INSTRUMENT
Filed Jan. 28, 1946  5 Sheets-Sheet 3
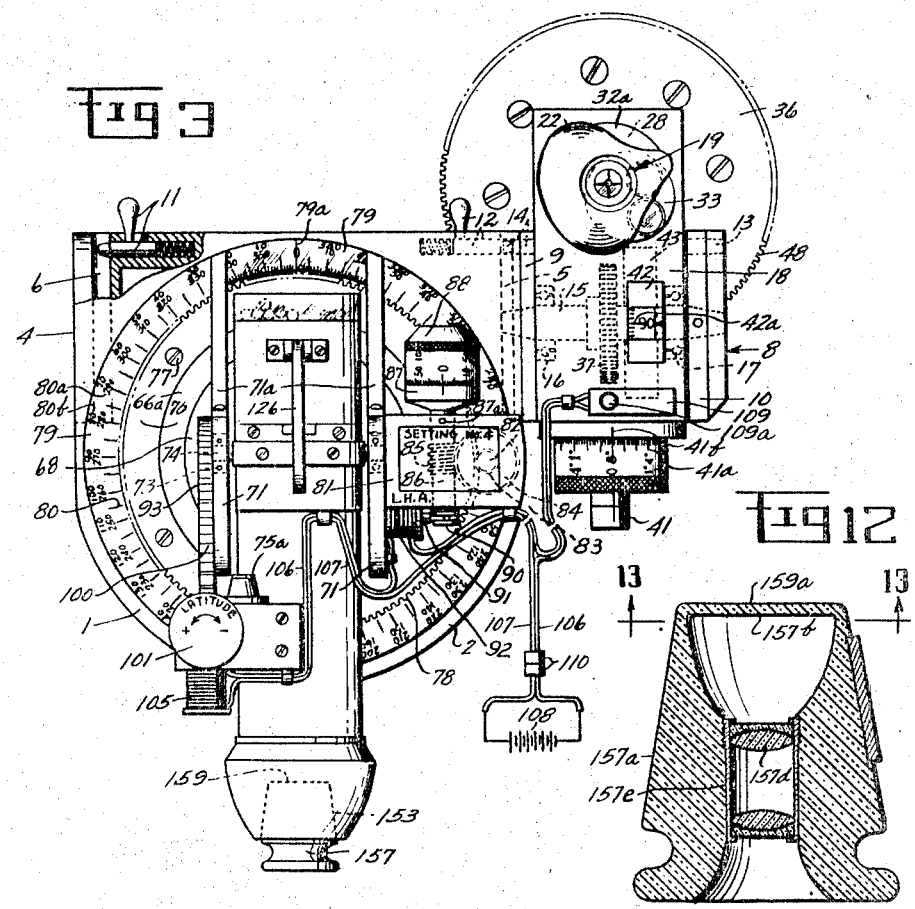
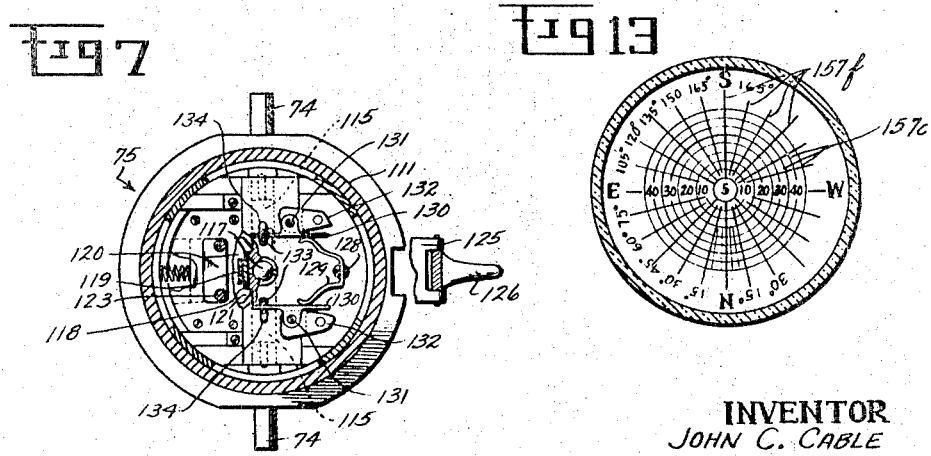
INVENTOR
JOHN C. CABLE
BY
HIS ATTORNEYS

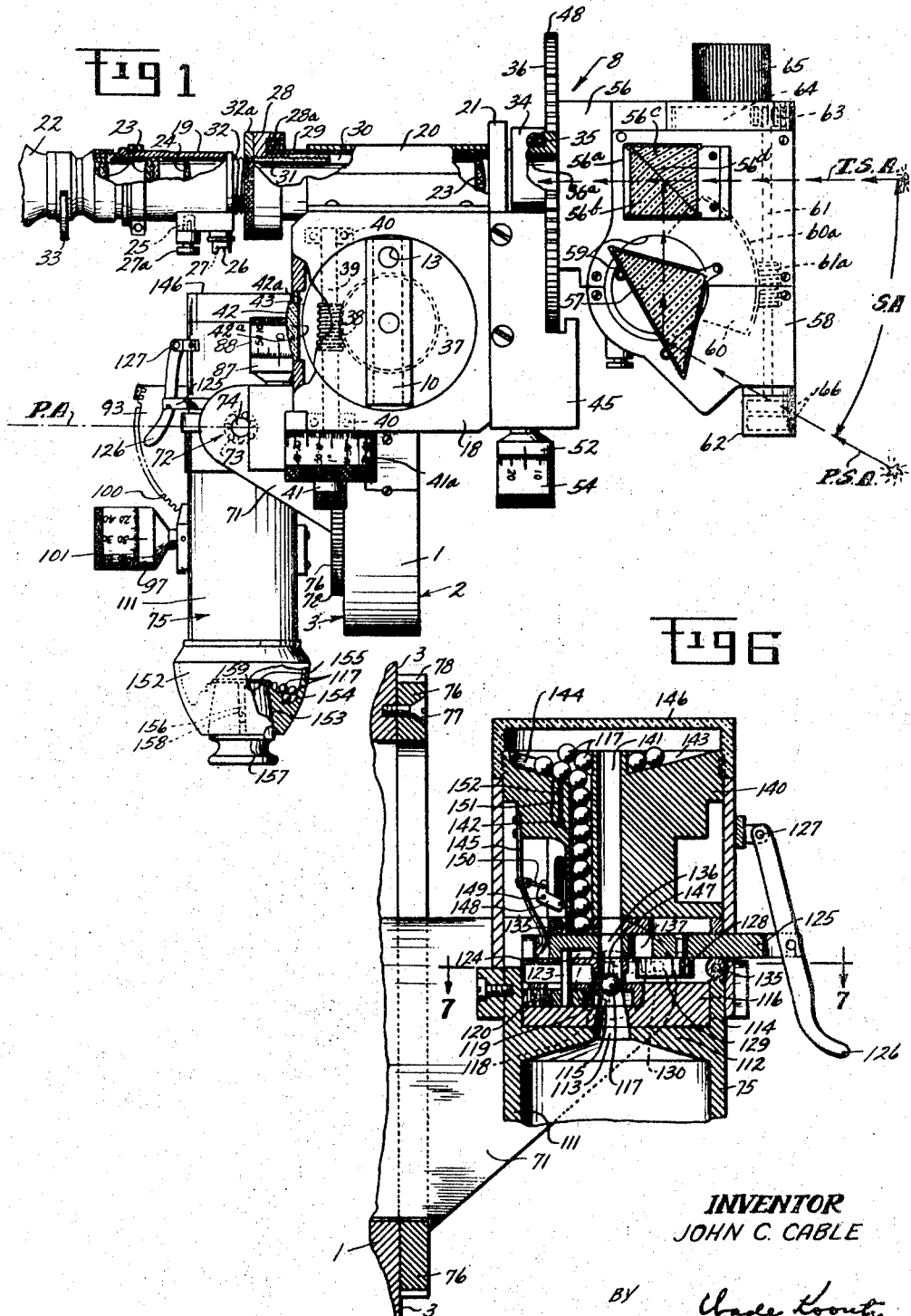

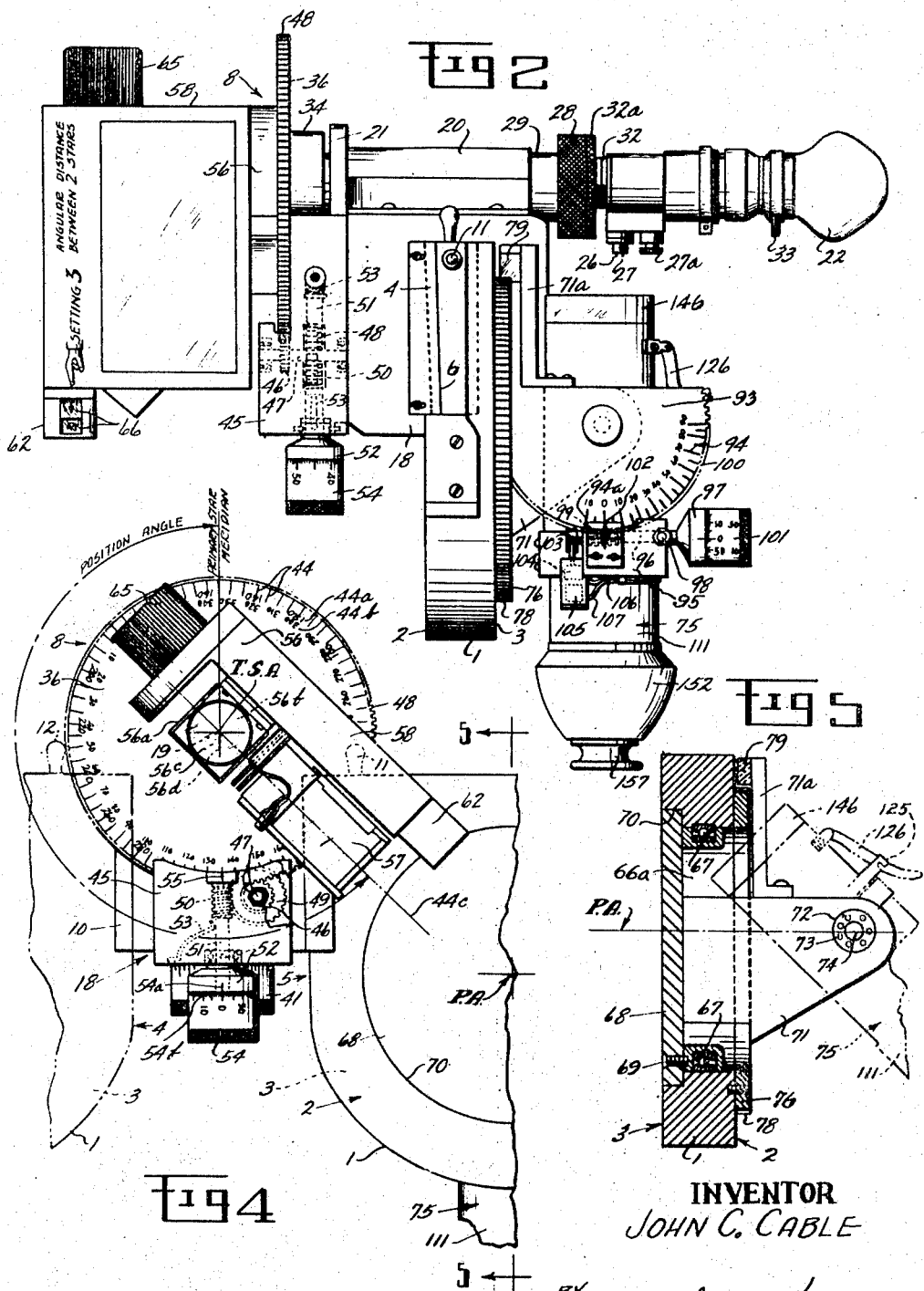

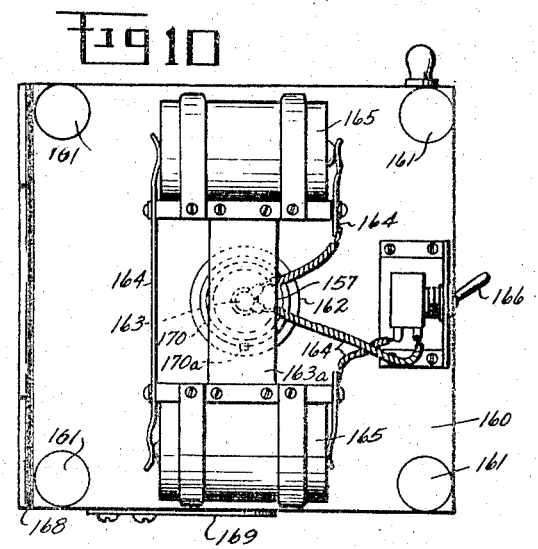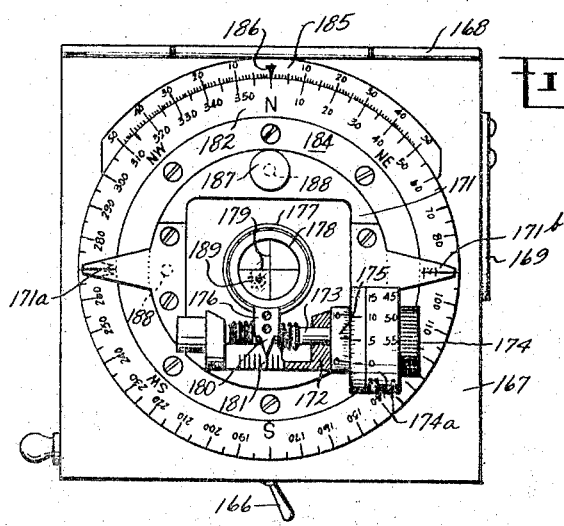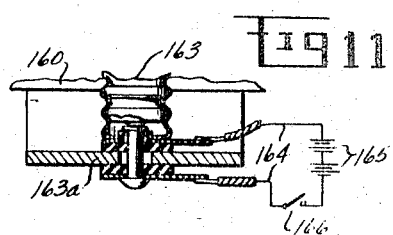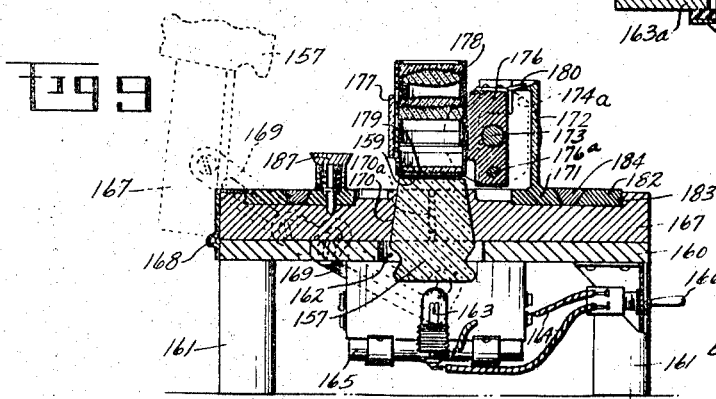

Sept. 4, 1951 J. C. CABLE 2,566,312
CELESTIAL NAVIGATION INSTRUMENT
Filed Jan. 28, 1946 5 Sheets-Sheet 5

INVENTOR
JOHN C. CABLE
BY
HIS ATTORNEYS

Patented Sept. 4, 1951

2,566,312

UNITED STATES PATENT OFFICE 2,566,312

CELESTIAL NAVIGATION INSTRUMENT

John C. Cable, Marshall, Mo.

Application January 28, 1946, Serial No. 643,957

23 Claims. (Cl. 88—2.4)

(Granted under the act of March 3, 1883, as amended April 30, 1928; 370 O. G. 757)

The invention described herein may be manufactured and used by or for the Government for governmental purposes without payment to me of any royalty thereon.

This invention relates to navigational and position finding instruments and more particularly to instruments for celestial navigation, having for one of its primary objects the provision of means of simultaneously sighting and collimating the images of at least two selected heavenly bodies for the purpose of accurately orienting and aligning a system of arcs and scales and reference planes with the celestial sphere and means for simultaneously recording this orientation relative to a true gravity vertical reference line to determine with accuracy and ease the direction of true north and the geographical location of the observer at the time of collimation.

Another object of the invention is the provision of a plural star collimating navigational instrument having a direct primary sighting axis for observing any primary selected navigational heavenly body or star, with adjustable collimating means incorporated in the instrument for presetting the instrument to the arc of angular separation and the position angle between the selected primary body or star and any other selected secondary or companion navigational body or star within a 90° separation angle, of the primary body, for collimating the two images, including means for rotating the instrument about the primary sighting axis to the position angle between the secondary body or star and the primary star, and determining in respect to a true vertical reference the direction of true north and observer's position during the collimation from said preset condition of the instrument.

Another object of the invention is the employment of the known position, or parallactic, angle of any selected navigational star measured from the precise location in the heavens of any other selected navigational star, and the employment of the position angle in conjunction with the known angular separation between the two stars to preset the sighting axes relative to a system of arcs, scales, and reference planes and relative to a vertical reference indicator system to directly determine the geographical location of the observer at any place on the earth where the two selected stars are visible and their images are in collimation in the instrument.

A further object is the provision of a plural star "fix" celestial navigational instrument in which a vertical reference means is provided, which is not necessary for the orientation of the instrument, but only for the purpose of providing a reference line relative to two other reference lines established by alignment of the star sighting axes of the instrument with the parallel rays of two stars, to determine the position of the observer relative to the position of the stars, during the collimated observation of said selected stars.

A still further object is the provision, in a preset plural star image sighting instrument, of means for accurately determining the position of the observer from the declination and sidereal hour angle position of any selected navigational star, the angular separation between that star and a second selected navigational star, and the known position angle of the second star with respect to the meridian and declination of the first-mentioned selected star.

A still further object is the provision of means for obtaining the latitude and longitude of an observer during a two-star collimating "fix," without the employment of computation or plotting at the time of, or after the simultaneous superimposed or coincident observation of the selected bodies.

Another object is the provision of improved celestial navigation means for obtaining a simultaneous two-star "fix," to accurately determine the geographical position of the observer, and to simultaneously determine either the true or magnetic direction and distance from the observer to his selected destination, without the use of calculations or computations at the time of or subsequent to the time of the observation.

Another object of the invention is the provision of means for obtaining a two-star image collimated "fix" on any two selected navigational stars having an approximate 90° or less separation angle, and simultaneously determining the latitude and longitude of the observer and the true north position without reference to a movable third collimated reference element such as a bubble.

A further object is the provision of celestial navigation means for simultaneously obtaining a plural star "fix" on any selected primary navigational star, whose declination and sidereal hour angle are known, and any selected companion navigational star whose position angle and angular separation with respect to the primary star are known, and determining the geographical position of the observer at the time of the "fix," without the use of computations, calculations, or the employment of a third shiftable vertical reference, such as a bubble.

A still further object includes the provision of means for determining and recording a vertical position reference at the geographical location of the observer during the coincident observation of any two selected navigational stars, without disturbing or affecting the collimation of the selected star images, and determining the geographical position of the observer without subsequent computations or calculations.

A still further object of the invention is the provision of celestial navigational means of the plural star collimating type, for finding the true north direction from a single collimated celestial observation of any two or more selected and visible navigational star images, without the observer having a knowledge of either his time or his geographical position.

Other objects and advantages of the invention will become more apparent from the following description taken in connection with the accompanying drawings, in which like reference characters refer to like parts in the several figures of the drawings.

Fig. 1 is a side elevation of my improved celestial navigation instrument, all settings being disposed at 0° with the exception of the separation angle setting for the secondary star sighting prism, parts being broken away and shown in section.

Fig. 2 is a side elevation of the instrument, illustrating the side thereof, opposite to the side disclosed in Fig. 1.

Fig. 3 is an end view of the instrument looking from the observer's end.

Fig. 4 is a fragmentary detail end view of the instrument from the end opposite to that shown in Fig. 3, showing the position angle adjustment for the secondary body adjusted to an angle from the position shown in the other figures. Parts are shown broken away and the equinoctial reference block or support is shown connected to one side of the primary and secondary star sighting and collimating means in full lines and connected to the other side in phantom.

Fig. 5 is a fragmentary vertical sectional view taken approximately on the plane indicated by the line 5—5 in Fig. 4.

Fig. 6 is an enlarged, fragmentary vertical sectional view through the upper portion of the ball dropping unit and a portion of the equinoctial reference support.

Fig. 7 is a horizontal cross sectional view through the ball dropping unit, taken approximately on the plane indicated by line 7—7 in Fig. 6, looking in the direction of the arrow.

Fig. 8 is a top plan view of a reading stand for use with the removable true vertical position recording plugs.

Fig. 9 is a vertical section view taken substantially midway through the reading stand.

Fig. 10 is a bottom plan view of the reading stand.

Fig. 11 is a detail fragmentary view of the lamp support, schematically showing the lighting circuit.

Fig. 12 is a vertical position indicating and recording plug which may be used with the instrument.

Fig. 13 is a cross sectional view taken on the line 13—13 in Fig. 12, looking in the direction of the arrows.

Figure 14:
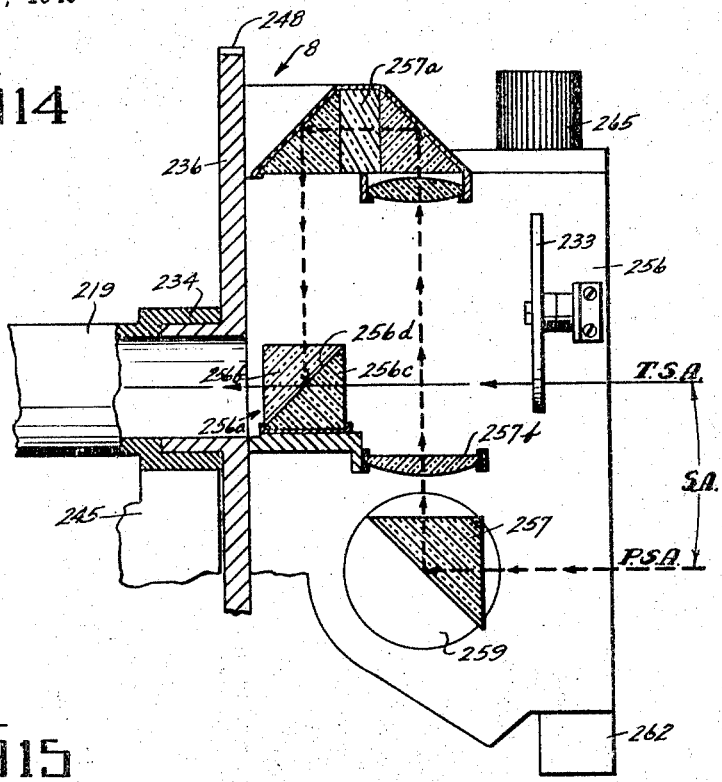

Fig. 14 is a fragmentary, somewhat diagrammatic, view of a slightly modified form of instrument, employing a collimating head having a magnifying objective in the secondary star sighting axis, providing two objective lenses of different focal lengths having a common eye-piece and providing an instrument for either day or night use.

Figure 15:
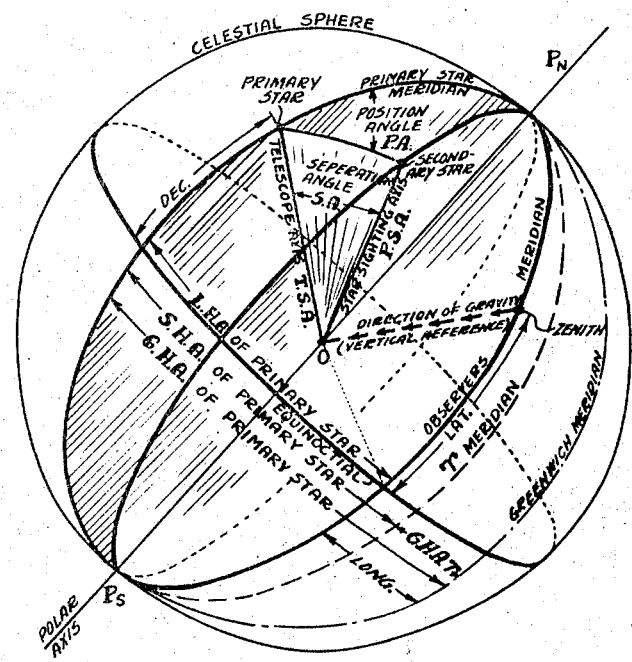

Fig. 15 is a diagrammatic illustration of the celestial sphere, showing the relative position and separation angles employed and their relation to the equinoctial and prime celestial meridian and the Greenwich meridian.

Referring more particularly to Figs. 1 to 4 of the drawings, the reference numeral 1 indicates a portable support or equinoctial reference block having parallel front and rear faces 2 and 3, and parallel side faces 4 and 5 disposed in planes perpendicular to the front and rear faces 2 and 3. The side faces 4 and 5 each have a tapered bayonet slot formed therein, as indicated at 6 and 7 in Figs. 2 and 3, the bayonet slots being of different depths to selectively receive and rigidly support a tiltable primary star sighting and secondary star sighting means indicated generally at 8.

The portable support 1 constitutes an equinoctial and polar axis reference means employed both in the presetting adjustments of the primary and secondary star image collimating means and while making the observation to determine the observer's geographical position, the front and rear faces 2 and 3 being disposed in planes parallel to the celestial equator while collimating the selected star images, with the polar axis of the instrument passing substantially through the center of the equinoctial reference block at right angles to the side faces 4 and 5, this polar axis being indicated at P. A.

The primary star telescope and secondary star sighting and collimating unit 8 is detachably and selectively connectable to either side face 4 or 5 of the equinoctial reference clock 1 by T-shaped connector blocks 9 and 10, these blocks being wedge shaped, and of different thicknesses to properly fit the respective bayonet slots 7 and 6 and rigidly support the telescope and collimating unit in a precise predetermined astronomical position on the support.

Manually actuable, spring tensioned locking bolts 11 and 12 are slidably carried in suitable guide recesses by the support, movable into locking engagement with apertures 14 and 13 formed in the upper ends of the respective supporting blocks 10 and 9, securely holding the telescope and collimating unit 8 in position on the support, preventing accidental displacement thereof.

A supporting shaft 15 rigidly connects the two T-shaped connector blocks 9 and 10 together, holding them in spaced parallel relation to each other with the shaft extending away from the equinoctial reference block 1 at right angles to the side faces 4 and 5 and parallel to the front and rear faces 2 and 3. This shaft 15 constitutes the tilting axis for the primary star sighting and secondary star collimating unit 8, journalled on the shaft 15 on precision ball bearings 16 and 17, carried in suitable bearing recesses formed in the opposite sides of a hollow telescope supporting casing or declination box 18, later to be described.

The primary star sighting telescope as indicated specifically at 19 in Fig. 1 is of somewhat conventional construction, being rigidly clamped in suitable receiving recesses formed in the top of the declination box or casing 18, by suitable clamping members 20 and 21. The telescope preferably has about a four power magnification with about a 10° field, and is provided with a rubber eyeshield 22 at its rear or observer's end, a conventional objective and lens system 23, crosshairs 24 to determine the star sighting axis, and an electric lamp 25 for illuminating the crosshairs 24. The lamp 25 may be supplied with electrical energy from any suitable source through conductors, not shown, that may be connected to the lamp contact terminals 26, 27. The light intensity is determined by a conventional rheostat in the lighting circuit, controlled by a manually adjustable knob 27a.

A focusing ring 28 is rotatably journalled on a relatively stationary sleeve portion 29 of the telescope and held against axial movement by the anti-friction bearing 28a. The stationary or clamped sleeve telescopically receives the smaller, objective end of the telescope and has a spline or key 30 projecting inwardly therefrom, through a longitudinal slot 31 formed in the reduced, threaded telescopic extension 32, preventing rotative movement between the clamped and telescopic portions 29 and 32 of the telescope.

The focusing ring 28 is threaded on the threaded telescopic extension 32, a locking or jam nut 32a being provided to lock the focusing ring against rotation, once the telescope is properly focused. A sun-shade or light intensity disc 33 is mounted in the eye-piece, eccentric to the sighting and collimating axis, the disc 33 having apertures of different light passing intensity which are adapted to be brought into the telescope sighting axis in the usual manner by manual rotative adjustments of the disc.

The front end portion of the telescope rigidly carries an enlarged concentric bearing sleeve or ring 34, having suitable precision bearings disposed therein, such as the ballbearings 35, for firmly supporting the secondary star sighting and collimating means for rotative adjustment around the telescope sighting axis in a plane perpendicular to the said sighting axis. The secondary star sighting and collimating means, later to be described, includes a sighting and collimating head or support, preferably having the form of a large centrally apertured disc or gear 36 with a central elongated sleeve-like bearing extension 36a projecting therefrom, journalled in the bearing support 35.

Referring again to Figs. 1 and 3, the declination axis shaft 15 projects through the declination box 18 and carries a large worm gear 37 thereon, meshing with a worm 38 on a vertical worm shaft 39, the shaft 39 being rotatably journalled in the declination box 18 at opposite ends on anti-friction bearings 40. The lower end of the worm shaft 39 projects through an opening in the bottom of the declination box and a manually adjustable micrometer declination setting head or knob 41 is secured on the projecting end of the shaft for presetting the declination angle of the primary star sighting axis of the telescope 19, with respect to the faces 2 and 3 of the equinoctial reference support 1, to the known, or calculated, declination angle between any selected primary navigational star or heavenly body, and the equinoctial or celestial equator.

A window 42 is provided in the face of the declination box 18, having a transparent closure with a lubber line 42a inscribed thereon, designed to register with a declination angle indicating indicia scale inscribed on a declination drum 43 which is rigidly secured on the declination shaft 15, with the periphery of the drum operating in close proximity to the window.

When the telescope sighting axis is disposed at right angles to the equinoctial reference or front or rear faces 2 and 3 of the portable support 1 the sighting axis will be in a polar axis reference position and a 90° declination angle will be indicated at the window 42 in registration with the lubber line 42a. The declination scale on the drum 43, seen through the window 42, has degree marks thereon indicating each 5° of declination N and S, and colored white and red, respectively. The declination micrometer knob 41 tilts the telescope 5° for each complete revolution, and is indexed into 150 equal spaces, each representing two minutes of arc. Opposite every thirtieth and every fifth mark are two sets of numbers 41a, indicating degrees and minutes respectively. One set of numbers increases in a counter-clockwise direction, and is white, while the other set of numbers increases in a clockwise direction and is red. If the observer is facing north and uses a primary star or body having a small south declination he would then use the red indications, otherwise white declination markings are used for north declinations when the observer is facing north and south declinations when facing south, regardless of whether the observer's geographical position is north or south of the equator.

Rotative adjustment of the secondary star sighting and collimating support, or gear 36, determines the "position angle" between the meridian of the primary selected star, represented by the tilt plane of the telescope 19 and the known, or precalculated, position of the selected secondary star or body, measured clockwise from the primary star meridian around the primary star sighting axis to the position of the secondary star. This support 36 therefore constitutes a position angle determining gear. A position angle indicating scale is inscribed on the top or front side of the gear 36 as indicated at 44 in Fig. 4, this scale being indexed in a complete circle for every degree. The scale 44 comprises two concentric sets of numbers, both increasing counter-clockwise in the same direction, as indicated at 44a and 44b, but these zero points of these scales are at 180° apart, both 0° points being in the tilting plane 44c of the secondary star sighting and collimating axis, later described. The outside ring of numbers 44a on the position angle gear is in white, for settings and observations in a north latitude direction while the inner ring 44b of position angle indicating numbers is in red, for making south latitude direction observations.

Located adjacent to the declination box or casing 18 and securely fastened to it, is a position angle gear box 45 containing a spur gear 46, fixed on a position angle adjusting shaft 47 that is journalled on anti-friction bearing carried by the box 45. The spur gear 46 meshes with teeth 48 extending around the periphery of the position angle gear or support 36. A larger worm gear 49 is secured to the shaft 47, meshing with a worm 50 fixed on a tiltable position angle adjusting shaft 51, carried in a pivoted cradle support or journal bearing 52, a spring 53 being provided for yieldably maintaining the worm 50 in meshing relation with the worm gear 49. The shaft 51 projects beyond the confines of the position angle box 45 and the pivoted shaft support or cradle 52 (see Fig. 2), and a position angle adjusting micrometer knob 54 is secured thereon, graduated in one minute intervals, one revolution of the knob causing a one degree adjustment of the position angle gear 36. A lubber line 54a is inscribed on the cradle or tiltable shaft support 52, for registration with graduations 54b on the knob 54. The worm 50, as seen in Fig. 4, may be manually disengaged from the worm gear 49 by grasping the knob 54 and tilting the same to tilt the shaft 51 out of mesh with the gear 49, against pressure of the spring 53, permitting the position angle gear or disc 36 to be quickly set to the approximate position angle of the secondary star, as indicated by the cooperative relation between the indicia circles 44a, 44b and a lubber line 55, inscribed on the position angle gear box 45. Returning the worm 50 to its meshing relation with the worm gear 49 establishes an interlocking driving relation to the nearest minute and degree, as indicated by the micrometer knob 54 and scale on the disc 36, after which the micrometer knob 54 may be adjusted to determine the finer adjustments of the position angle gear. Rigidly mounted on the position angle support or disc 36 is a supporting bracket 56, as best seen in Figs. 1 and 4, for tiltably carrying the secondary star sighting right-angle prism means. The bracket 56 has a beam splitting cube prism member 56a rigidly mounted thereon, directly over the hole in the center of the position angle gear 36 so that its center coincides exactly with the telescope sighting axis. This beam splitting prism 56a comprises two right-angle prisms 56b and 56c with the hypotenuse face of one of the prism partially silvered to provide a semi-transparent reflector 56d, mounted with the semi-transparent reflecting face 56d at a 45° angle to the plane of the position angle gear 36 and the telescope sighting axis, and tilting toward the 0° mark on the inner position angle scale 44b.

A secondary star sighting right-angle prism 57 is tiltably carried on the bracket 56 at one side of the cube prism 56a in a plane passing through the two 0 marks of the position angle scales 44a and 44b and a plane at right angles to the sighting axis of the telescope 19. The right angle prism 57 is mounted for adjustable tilting movements on the bracket 56 on a separation angle gear box 58, on an axis transverse to the sighting axis of the telescope, with the hypotenuse face of the prism disposed away from the split cube prism 56a. Angular adjustments of the right-angle prism 57 about its tilting axis adjusts the separation angle S. A. between the primary star direct sighting axis T. S. A. of the telescope 19 and the secondary star sighting and collimating axis P. S. A. of the prism, the secondary star axis being adjustable to any known or precalculated separation angle between any primary selected navigational star, or heavenly body, and any secondary star or companion navigational body which is in the plane of the position angle for the secondary body, as determined by the rotative adjustment of the position angle support or gear 36.

For the purpose of adjusting the prism 57 about its tilting axis, the prism is fixedly mounted on a suitable, annular, rotatable carrier member 59 having a worm segment 60 secured thereto within the separation angle gear box 58, the worm segment 60 having rather fine worm teeth 60a on its periphery meshing with a worm 61a carried on a separation angle adjusting shaft 61, suitably journalled in the gear box 58, one end of the shaft 61 being connected to a separation angle indicator or counter unit 62, better disclosed in Fig. 2. The other or upper end of the worm shaft 61 carries a small pinion 63 meshing with an internal ring gear 64 formed in an enlarged annular flange of a manually settable separation angle determining knob 65, carried on a fixed bearing on the top of separation angle gear box 58.

Rotation of the knob 65 rotates the worm shaft 61, adjusting the angular relation between the right-angle prism 57 with respect to the fixed cube prism 56a, rotation of the shaft 61 also adjusting the separation angle indicating counters 66 within the separation angle indicating box 62, indicating the separation angle S. A. between the primary and secondary sighting axes T. S. A. and P. S. A. of the primary start sighting and secondary start sighting means.

By setting the declination of any selected primary navigational body or star, as indicated by the declination indicia on the drum 43, observed through the declination box window 42 and the finer adjusting indicia 41a on the setting knob 41, the primary star or body may first be located by direct sighting through the telescope. By rotative adjustment of the position angle gear 36 to the known position angle between the primary and any selected secondary body as indicated by the setting scale 44, the angular position of the secondary body sighting axis around the sighting axis for the primary body, from the meridian of the primary body, is determined and preset up in the instrument. Rotation of the knob 54 accomplishes this setting of the instrument.

The third presetting operation is accomplished by adjustment of the separation angle adjustment knob 65. Rotation of this knob, to accord with the separation angle indications of the angle counters 66 within the separation angle indicator box 62 presets primary and secondary sighting axes to the separation angle between the selected primary and secondary bodies. It is desirable to select any two stars or navigational bodies whose separation angle does not exceed 90°, since the instrument disclosed in the drawings does not permit the use of a greater separation angle than 90 degrees. It is not intended to limit the construction to a separation angle of 90°, since it is a matter of design rather than invention to employ a separation angle counter indicating and adjusting means permitting more than a 90° adjustment, in which event substantially any pair of stars or heavenly bodies, regardless of their separation angle, may be used to obtain the observer's geographical position.

Once the declination of the primary star, the position angle of the secondary star with respect to the meridan of the primary star, and the degree of angular separation between the selected stars is determined and preset, the primary star is sighted through the telescope and centered on the cross-hairs of the telescope. By rotating the telescope about the primary sighting axis to the primary star, the secondary star or body may be sighted and brought into alignment with the cross-hairs in the telescope by reason of the preadjusted position of the secondary sighting optical system constituting the prisms 56 and 57 and their adjusting means.

When the selected secondary body image is collimated with the primary body image in the telescope sighting axis, the equinoctial reference means, or faces 2 and 3, of the equinoctial reference block will be precisely parallel to the celestial equator and the tilting axis of the telescope will be in the meridian of the primary star with the polar axis P. A. extending through the center of the equinoctial reference block, pointing directly to the celestial pole. No further adjustment is necessary to determine the north-south polar axis from any two selected stars that may be visible to the observer within approximately 90° or less of each other.

Latitude may be determined directly while simultaneously observing the selected stars, and the local hour angle of the primary body may also be determined directly during the observation, since a gravity operated vertical reference member is provided, suspended universally from the equinoctial reference member, and free to move along a calibrated scale at right angles to the equinoctial reference member to indicate the angle of tilt in the observer's meridian between the equinoctial reference and the vertical, which is the latitude, and also free to move along a second calibrated scale at right angles to the first to indicate the tilt of the vertical reference in a transverse plane thereby determining the angle between the meridian of the primary star and the observer's meridian, which is the local hour angle of the primary body.

Means is provided to permit the vertical reference to gravitate to an approximate vertical position while collimating the images of the selected bodies through the telescope, with provision for locking the vertical reference in its approximate vertical, together with supplemental vertical reference means for determining and recording any variation between the approximate vertical and the true vertical at the observer's geographical position. Manually operable presetting means have also been provided for presetting the vertical reference in an assumed vertical position for an assumed geographical position of the observer, both as to longitude and latitude, the supplemental or true vertical indicating reference means carried by the instrument, indicating and recording the angular difference in degrees between the preset assumed vertical before collimating the selected bodies and the true vertical at the observer's position while collimating the bodies. Means is also provided for directly indicating the bearing direction between the assumed position of the observer and observer's true geographical position while collimating the images of the stars, together with means for indicating and recording the distance in degrees or nautical miles between said assumed and true geographical positions of the observer.

Referring more particularly to Figs. 3 and 5, the equinoctial reference block 1 is formed with a central circular opening 66a extending therethrough, having an axis perpendicular to the said equinoctial reference faces 2 and 3, and therefore parallel to the polar axis reference position of the block, a precision bearing of the anti-friction type, indicated at 67, is secured to the annular wall of the opening 66a for rotation, in a plane parallel to the front face 3. A primary vertical reference member supporting circular plate or disc 68 is fixedly secured to the rotatable element of the bearing 67 by threaded fasteners 69. The disc 68 is mounted in an annular concentric recess 70 formed in the wall of the opening 66a as clearly illustrated in Fig. 5, disposing the front face of the rotary disc or plate 68 flush with the front face 2 of the block 1. Spaced vertical reference supporting means in the form of brackets or arms 71, 71, are rigidly secured to the rear face of the plate 68, projecting rearwardly through the opening 66a, beyond the rear face 3 of the equinoctial reference block 1. Diametrically opposite bearing apertures 72, 72, are formed in each plate with their centers disposed in a plane parallel to the equinoctial reference faces 2 and 3 and in a second intersecting perpendicular plane passing through the rotative axis of the plate 68.

Precision anti-friction bearings 73 are disposed in the apertures 72, in which are journalled diametrically opposite suspension arms 74 projecting from a primary, or assumed, vertical reference means indicated generally at 75, later to be described in detail.

The vertical reference suspension brackets or arms 71, 71, each have an upstanding arm 71a secured thereto, disposed in parallel juxtaposed relation to a calibrated face of a local hour angle ring gear 76, secured by screw fastenings 77 to the rear face 3 of the equinoctial reference block 1. The arms 71a project beyond peripherial teeth 78 of the gear 76 and carry a transparent lubber line plane 79 therebetween, disposed over the annular local hour angle scale 80 inscribed on the face of the ring gear, this scale being graduated in 1° intervals, two concentric rings of numbers forming the scale 80, the inside set of numbers 80a being white and increasing clockwise from 0° to 360° for use in the Northern Hemisphere to indicate west L. H. A. (local hour angle), while the outside numbers 80b are red, increasing in a counter-clockwise direction from 0° to 360° for use in the Southern Hemisphere to indicate west L. H. A. The 0° to 180° line of the scale 80 passes through the center of rotation of the disc 68 and the tilt or suspension axis of the vertical reference member 75, in a plane parallel to the tilting plane of the telescope 19 as it is adjusted in declination.

A lubber line 79a is inscribed on the transparent plate 79, disposed for registration with the 0° mark on the L. H. A. scales only when the tilting plane of the vertical reference 75 about the axis through the brackets 71 is parallel with the L. H. A. 0-180° line of the scale 80, as before set forth.

L. H. A. assumed position adjusting means, and releasable locking means, are provided between the equinoctial reference support 1 and the vertical reference member 75, comprising a L. H. A. gear box or casing 81 rigidly secured to the side face of the right-hand supporting bracket 71, as seen in Fig. 3. This gear box 81 has a shaft 82 journalled therein, preferably on anti-friction gearings, the shaft 82 having a spur gear 83 fixed thereon, meshing with the teeth 78 on the fixed L. H. A. ring gear 76. A larger worm gear 84 is also fixed on the shaft 82, meshing with a worm 85 on a micrometer shaft 86 which is journalled in a tiltable support or cradle 87 within the L. H. A. gear box 81 and pivoted at 87a, spring means being provided to yieldably maintain meshing relation between the worm 85 and the worm gear 84. The upper end of the shaft 86, projecting beyond the cradle 87, has a micrometer adjusting knob 88 (Fig. 3) secured thereto, inscribed in degrees in the same manner as the position angle micrometer 54, with the exception that it has rings of numbers in white and red, indicating minutes increasing in opposite directions from 0°, the white and red being respectively usable in the Northern and Southern Hemispheres. These scale indicia register with a lubber line 89 inscribed on the cradle 87, as seen in the drawings. The lower end of the L. H. A. shaft 86 projects through a suitable opening in the gear box 81 and has a collar 90 journalled thereon. An armature 91 (Fig. 3) is pivoted to the collar 90 and extends into the core of a solenoid magnet 92 which is secured to the right-hand bracket arm 71. Manually operable electrical switch and circuit means are provided for energizing the magnet 92 to disengage the worm 85 from the worm gear 84, permitting free rotative movement of the vertical reference in the equinoctial reference plane, only while the energizing circuit is closed or energized.

The L. H. A. micrometer knob 88 is also capable of manual tilting movement about the pivot 87a to disengage worm 85, permitting rapid manual preadjustment and locking of the vertical reference member 75 in an assumed vertical position for the assumed geographical position of the observer, for the L. H. A. time of collimation of selected star images.

Secured to the left-hand vertical reference supporting bracket 71, as seen in Figs. 2 and 3, is a latitude indicating gear segment or plate 93 having a latitude scale 94 inscribed thereon, graduated for every degree between 0° and 90°. The vertical reference member 75 has a latitude adjusting gear box 95 fixed thereon, containing a latitude micrometer shaft 96 rotatably carried in a cradle 97 which is pivoted at 98. The shaft 96 extends through the latitude gear box 95, as best seen in Fig. 2, and a worm 99 fixed thereon is disposed for meshing engagement with teeth 100 on the periphery of the latitude segment 93. The shaft 96 carries a micrometer setting knob 101, calibrated in minutes, similar to the local hour angle setting knob 88, two sets of indicia being provided in white and red. It should be noted that the 0° and 90° points of the scale 94 are disposed respectively in register with a lubber line 102 on the latitude box 95, when the vertical reference 75 is in a plane perpendicular to the equinoctial reference, and when in a plane parallel to the equinoctial reference, provision being made for tilting the vertical reference 10° beyond the 0° or equinoctial reference plane in one direction, as indicated at 94a on the scale 94. The micrometer scale on the hand knob 101 is calibrated in divisions of one minute, each division indicates a movement of one minute of arc for the vertical reference member 75, one revolution of the knob 101 tilting the vertical reference member one degree. The forward end of the latitude micrometer shaft 96 has a collar 103 rotatably secured thereon, to which is pivotally connected an armature 104 for a solenoid magnet 105, secured to the vertical reference member 75. A spring yieldably maintains the worm 99 in meshing relation with the worm teeth 100 on the periphery of the latitude segment 93; energization of the magnet 105, however, disengages the worm 99 permitting the vertical reference member to gravitate to an assumed vertical reference position about its pivotal axis in the bearing members 74.

Manual manipulation of the latitude micrometer knob 101 permits the observer to positively preset the vertical reference positions of the vertical reference member to an assumed vertical position for the assumed latitude of the observer, for the time of subsequent coincident sighting and collimation of the selected images of the stars or bodies through the telescope.

The solenoid coils of the magnets 92 and 105 are connected in series by the electrical conductors 106 and 107, to an electrical power source or battery 108, with a normally open micro switch 109 in the conductor 106 and conveniently located for operation by the observer, either on the declination box 21 (as shown in Fig. 3), or on the equinoctial reference block 1, suitable disconnect terminals 110 being provided for between the conductors leading to the battery 108 and to the switch element 109, especially when the same is mounted on the declination box 21 as shown, since the declination box is removable from the equinoctial reference block by withdrawal of the locking bolt 12, and may be transferred to the opposite end of the equinoctial reference block.

The vertical reference member 75 is balanced to swing to a vertical position when the micro switch button 109a is depressed, closing the circuit including the magnets 92, 105, and its battery 108. Release of the switch button 109a causes a simultaneous release of the two worm shaft holding armatures 91 and 104, the return springs for the work shafts 86 and 96 cause instantaneous and simultaneous locking engagement of the worms 85 and 99 with the local hour angle and latitude gear elements, locking the vertical reference member in its gravitated or approximate vertical reference position.

Since the gravity operated vertical reference member 75 depends somewhat below its suspension point, its plane of swing may be in the tilting path of the telescope 19 under some preset sighting condition of the instrument. In this event the declination box 21 may be removed from one side of the celestial reference block 1, by withdrawing the lock bolt 12 (or 11), and replacing the declination box at the other side of the equatorial reference block, as clearly shown in full and dotted lines in Fig. 4 of the drawings. This important detail of construction permits the vertical reference member 75 to assume a vertical reference position for the collimated observation of the images of any two, or more, selected navigational heavenly bodies anywhere in the celestial sphere, with the observer located at any position on or above the earth, without interference between the telescope 19 and the side of the vertical reference member 75.

The vertical reference member 75, employed in the instrument illustrated, is a "ball dropping unit" of somewhat conventional construction having means for dropping a plurality of balls from the tilting center of the unit, and recording the mean impact point of the freely falling balls, also recording the variation in degrees and minutes between the recorded mean impact point of the balls and the "vertical" axis of the ball dropping unit. The ball dropping unit constitutes a primary or assumed vertical reference means, while the ball dropping and mean impact recording means constitutes a secondary or true vertical position reference means. The ball dropping unit disclosed in the drawings does include certain novel features, however, over the conventional ball dropping units now in use, which known devices determine primary and secondary vertical references in one plane only. Means is provided in my improved instrument for directly recording the bearing direction and distance in degrees between the assumed geographical position of the observer, as determined by the assumed vertical position of the primary vertical reference means, and the true geographical position of the observer during the collimation of the selected star images, as determined by the mean recorded ball impact pattern of the secondary vertical reference means caused by the freely falling balls released from the universal suspension point of the primary vertical reference means at the time of collimation of the bodies.

Referring to Figs. 6 and 7 the ball dropping unit comprises a casing 111 formed with an inwardly projecting annular flange 112 having a central opening 113 therein upon which is seated the ball recording and dropping mechanism indicated generally at 114 and shown more particularly in Fig. 7. The ball dropping means comprises two slide bars 115 and 115 (Fig. 7) which are carried in guide channels formed in a supporting block 116, resting on the top of the partition 112. The adjacent edges of the slide bars 115 are curved on a radius slightly less than the diameter of the balls 117 to be used, which blocks have a stop shoulder 118 engageable with a fixed stop projection 119 on the supporting block 116, limiting the inward movement of the slide bars toward each other and positioning the arcuate ball supporting surfaces concentric with the central axis of the casing 111, supporting the balls at the tilting center of the casing 111. A locking bolt 129 is slidably carried in a suitable guiding recess in the supporting block 116 having locking projections 121 thereon, disposed for locking engagement with the stop shoulders 118, locking the slide blocks 115 against separation. A spring 122 presses the locking bolt 120 toward the slide bars 115, the locking bolt having a pair of upstanding projections or pins 123 extending into an elongated recess 124 formed in a release and ball transfer slide 125 (Fig. 6) disposed in suitable guide means above the supporting block 116. The release slide 125 is connected at its outer end to a trigger 126 pivoted to the upper end of the casing 111, at 127, as best seen in Fig. 6. The release slide 125 carries a depending spring support 128, having a U-shaped leaf spring 129 disposed between a pair of pivoted spring actuators or levers 130, that are pivoted at 131 on ears 132 carried on the upper side of the supporting block 116. The slide bars 115 each have a pair of upstanding pins 133, projecting through elongated slots 134 (Fig. 7) in the upper face of the supporting block 116, the pins straddling one end of each of the centrally pivoted spring levers 130.

The ball release and transfer slide 125 is suitably mounted on rollers 135, the slide having a ball transfer opening 136 extending therethrough and an adjacent ball return opening 137 extending therethrough. The casing 111 is formed with a ball magazine 140 having a ball return conduit 141 formed therein concentric with the axis of the casing 111, and disposed in registration with the ball transfer opening 136 in the slide, when the slide is in the position shown in Fig. 6. A ball feeding or magazine tube 142 is formed in the ball magazine casing, in offset parallel relation to the ball return conduit 141, in the plane of movement of the transfer slide 125, at a radial distance equal from the return tube axis to the distance between centers of the ball transfer and return openings 136 and 137 in the slide 125. An inwardly and downwardly tapering ball holding recess 143 extends around the upwardly projecting end of the ball return conduit 141, below the end thereof, having a radial channel 144 as shown in Fig. 6, disposed in communication with the ball feeding or magazine tube 142. The transfer slide 125 is normally disposed in the position shown in Fig. 6 tensioned to this position by a leaf spring 145, projecting from the ball magazine unit into actuating engagement with the inner end of the slide member 125.

A transparent cover 146 is threadably received on the upper end of the ball magazine unit 140 for retaining the balls in the ball recess when the unit is inverted. In the operation of the ball dropping unit as disclosed in Figs. 6 and 7, when the observer is desirous of releasing a ball 117, inward pressure on the lower end of the lever 126 forces the slide 125 inwardly against the tension of the return spring 145. As the slide moves inwardly the free ends of the U-shaped leaf spring 129, carried by the downwardly depending spring carrier 128 on the slide, move inwardly past the pivotal centers of the centrally pivoted springs 130. The ends of the springs extending between the pins 133 on the slide bars 115 are now tensioned to swing away from each other. Further inward movement of the slide block 125 causes the end of the recess 124 thereon, next to the ball transfer opening 136, to engage the upstanding projections or pins 123 carried by the locking bolt 120. Further inward movement of the slide 125 causes simultaneous disengagement of the locking projections 121 from the stop shoulders 118 on the ball supporting slide bars 115. When this occurs the springs 129 quickly and simultaneously rock the two pivoted spring levers 130 around their pivots 131, moving the ball supporting slide bars 115 out of their supporting engagement with a ball 117 permitting the ball to drop freely through the opening 113 in the partition 112.

During this release operation of the slide block 125 by the observer, the ball transfer opening 136 is disposed directly under the magazine or ball feeding tube 142 permitting a ball to drop into this opening 136. As the observer releases the lever 126, the spring 145 returns the lever to its initial position as seen in Fig. 6. As the spring 129 is moved to the right, past the pivots 131 of the centrally pivoted levers 130, the two ball supporting slide bars 115 are brought toward each other again in ball holding position against the stop projection 119. Simultaneously the engaging end of the recess 124 in the slide block 125 moves away from the upstanding pins 123 carried by the locking bolt, permitting the locking bolt return spring to move the locking bolt into locking engagement with the projections 118 on the slide bars 115. As this occurs the ball transfer opening 136 with the ball therein moves into alignment with the opening 113 in the partition and in alignment with a small tubular passage 147 extending between the slide block 125 and the opening in the supporting block 116 directly above the arcuate ball supporting surfaces of the slide bars 115, permitting the ball 117 to drop onto the arcuate supporting surfaces of the ball supporting slide bars.

The recess 143 is designed to hold about 40 or 50 balls, each reciprocation of the slide bar 125 permits the ball holding jaws to open, dropping a ball through the opening 113, and to subsequently transfer a ball from the magazine to the holding jaws. After the magazine has been emptied, and it is desired to return the balls, it is only necessary to press the release member 126 inwardly, moving the ball return opening 137 into alignment with the return tube 141, the inward movement of the slide 125 causing the ball holding jaws to open. Inverting the vertical reference member 75 causes the balls to gravitate back through the return tube into the space between the ball holding recess 143 and the cover 146. The unit is again ready for operation as soon as it is turned right side up. Means are provided for preventing the balls 117 from jamming at the entrance to the ball feeding tube 142, this means comprising a bell crank lever 148 pivoted at 149 to the ball magazine unit 140, one end of the bell crank being connected by a link 150 to the return spring 145, the long end of the bell crank being connected to a vertical lifter rod or actuator member which is slidably disposed in a guide passage or conduit 152 opening into the ball recess 143 at the point where the balls enter the ball feeding tube magazine 142. As the slide 125 is moved inwardly, the bell crank 148 is rocked, lifting the actuator rod 151, which displaces any balls that may be jammed in the entrance to the feeding tube.

The lower end of the casing 111 of the ball dropping unit has an enlarged head 152 secured thereon, as best seen in Fig. 1, this head having a tapered opening 153 formed therein concentric to the vertical or central axis of the ball dropping unit and concentric with the line of fall of balls when released from the ball dropping means when the ball dropping unit is disposed in a true vertical position. An annular recess 154 is formed in the head 152, around the tapered recess 153, and constitutes a reservoir for the balls that are dropped by the ball dropping means. The central portion of the head 152 extends upwardly around the tapered opening and a carbon cloth or ribbon 155 is tightly stretched across the inner end of the tapered opening 153 as clearly shown in the drawing, one side of the tapered opening 153 having an orienting groove 156 formed therein.

A tapered ball impact recording plug 157 is provided, having a key 158 in one side thereof for orienting the plug with respect to the ball dropping unit. The upper or impact recording face 159 of the plug is disposed in close proximity to the carbon cloth 155 when the plug is inserted in the tapered recess 153, so that balls dropped by the ball release means and striking the carbon cloth 155, will record their impact position on the recording or end surface 159 of the plug 157 and the relation of the impact position with respect to the vertical axis or center of the vertical reference means 75.

The plugs 157 are removable and interchangeable, and it is therefore possible for the observer to accurately record his position from time to time within a distance of approximately 300 miles without changing the set position of the assumed vertical reference means 75, so long as the variation between the vertical longitudinal axis of the casing 111 and the line of fall of the balls does not exceed 7½°. A spirit level 75a is also provided, fixed on the casing 75 for determining the approximate vertical of the casing, if desired.

A reading or position determining stand is preferably provided for determining the direction or bearing and distance in degrees, minutes or nautical miles between the means impact point of the balls 117, recorded on the smooth transparent recording face 159 of the removable transparent plug 157, and the center of the plug. The recording stand comprises a rectangular supporting block or base plate 160 supported on legs 161, the plate having a central aperture 162 formed thereon, larger than the diameter of the head of the transparent impact recording plug 157.

An electric lamp 163 is carried by a U-shaped bracket 163a on the supporting plate, directly below the center of the aperture 162. Any suitable means may be provided for illuminating the lamp 163 such as an energizing circuit 164 including the batteries 165 and a manually operable control switch 166 fixed on the base 160 for convenient operation by the observer.

A supporting cover plate 167 is hinged to the base plate 160 by a piano hinge 168, permitting the cover plate to be raised away from the base plate. A supporting latch 169 is pivotally secured to the cover plate for releasably supporting the cover plate in raised position as shown in dotted lines in Fig. 9. A tapered recess 170 is formed in the under side of the cover plate, having a configuration identical to the tapered opening 153 in the lower end of the vertical reference member 75, an orienting groove keyway 170a being formed in the side of the tapered recess 170 for orienting the tapered plug 157, as it is positioned in the tapered recess, to the same position, with respect to the north-south east-west direction indications it occupied in the vertical reference member 75 with respect to the polar and equinoctial reference means.

The axial center of the tapered recess 170 is the same distance from the hinge axis 168 as the axial center of the aperture 162, so that when one of the plugs 157 is tightly inserted in the tapered recess 170 and the lid or cover is closed, the electric lamp 163 will be disposed directly below the lower end of the tapered plug, on its axial center, with the impact recording surface 159 of the plug facing upwardly through the tapered recess 170, to a position above and parallel with the top surface of the cover plate.

Illumination of the lamp 163 therefore, with the cover closed, clearly illuminates the ball impact position recording surface 159 through the transparent plug 157 from underneath, causing the impact patterns of the balls that were dropped on the carbon ribbon 155 when the plug was in position in the vertical reference member, to be clearly visible to the observer from above, even in the dark.

An annular carrier plate 171 is rotatably journalled in an annular recess formed in the top of the cover plate 167, having an axis concentric to the axis of the tapered hole or recess 170, and therefore concentric to the center of the recording surface 159 of the plug 157. The carrier plate has an upstanding, axially offset bracket 172 formed integrally therewith in which is suitably journalled a micrometer screw shaft 173, fixed against axial displacement at its ends. A micrometer adjusting knob 174 is secured on one end of the shaft 173, with a distance-degree scale thereon, registering with a vernier scale 175 inscribed on the bracket, as seen in Fig. 9.

A carriage 176 is threadably received on the shaft 173 having a guide opening formed therein, below the shaft for receiving a guide rod 176a rigidly supported at each end in the bracket 172. An arm 177, having a circular opening therein for receiving a magnifying eye-piece, projects laterally from the carriage 176, as seen in Figs. 8 and 9, the axial center of the annular opening just referred to being disposed in a plane passing through the axial center of the tapered plug receiving opening 170 and parallel to the axis of the screw shaft 173.

A magnifying objective lens and mount 178 is received in the circular opening, the objective having two sets of intersecting cross-hairs inscribed on opposite sides of the cross-hair glass 179 disposed in close parallel proximity to the upper or recording surface 159 of the plug 157 when inserted in the tapered recess. The objective lens is oriented in the arm 177 to dispose both sets of cross-hairs in transverse intersecting vertical planes respectively parallel to the axis of the micrometer shaft 173 and perpendicular to the said shaft axis.

With the intersection of the cross-hairs directly over the center of the plug 157 one complete rotation of the micrometer knob 174 displaces the cross-hairs in a plane parallel to the axis of the shaft 173 an amount equal to one degree of arc for a radius equal to the distance from the tilting center of the ball dropping unit 75 to recording surface 159 of one of the plugs 157 carried by the ball dropping unit below the release point for the balls. The micrometer indicia on the knob of 174 is divided into sixty divisions, each indicating one minute of arc, while the vernier 175 permits an adjustment of the cross-hair lines to one-tenth of a minute arc.

A pointer 180 is fixed to the top of the carriage 176, projecting over a degree indicating scale 181 having a mid-point, indicating a concentric position of the cross-hairs with the central axis of the recording plug 157.

An annular ring 182 is rotatably carried in the circular recess 183 in the top of the cover plate, 167, held in concentric relation to the carrier plate 171 by a retaining ring 184 secured to the cover plate. The upper surface of the ring 182 inscribed in degree divisions, similar to a "compass rose," with distinctive N., S., E., and W. indications thereon. This direction bearing indicia is disposed for selective registration with an arcuate degree scale 185, having a mid-point 186 indicating the N.-S. oriented position of the plug in the cover which is similar to the oriented position of the plug 157 when in the vertical reference member 75. In other words, a line or a plane passing through the point 186 on the scale 185 and the center of the recording surface of the plug, when in place in the cover is the same, in relation to the orientation of the plug when in the vertical reference means 75, as a line or plane passing through the vertical axis of the vertical reference member 75 and center of the plug recording surface 159, and parallel to the tilting plane of the vertical reference member in the bearings 74 in the spaced supporting arms 71 which are carried by the rotable plate 68 on the equinoctial reference support 1, the plug being oriented in the vertical reference means 75, and in the cover 167, with respect to the north-south polar axis, and consequently the position of the ball pattern with respect to the plug center will be indicated relative to the north-south east-west direction or bearing.

The fixed scale 185 is graduated in degrees E and W of the north direction indication 186, up to 50°. The adjustable ring 184 is divided into 360° and when its N point is in registration with the north point 186, a complete bearing direction indicia is provided for all points of the compass.

The lens carrier plate 171 is provided with diametrically opposite transparent pointers 171a and 171b overlying the indicia on the ring 182 and designed to register with it, or with the indicia on the scale 185. The pointers 171a and 171b both lie in a plane passing through the center of the plug recess 170, and through the axis of rotation of the carrier 171, parallel to the micrometer shaft 173, the cross-hairs 179 being coincident and transverse to this plane.

The carrier plate 171 has a spring pressed releasable locking plunger 187 therein, disposed for locking engagement with two locking recesses 188 formed in the upper face of the cover, below the carrier plate. The plunger 187 seats in one or the other of these locking recesses 188 when the pointers 171a and 171b are pointing in a relative north-south direction through the point 186 on the scale 185, or are pointing in an east-west direction as shown in Fig. 8.

Assuming that the ball impact pattern of the balls on the recording surface 159 of the plug 157, as viewed through the magnifying lens 178, is indicated at 189, this pattern lies in a south and east direction with respect to the intersection of the cross-hairs 179, since the carrier plate as seen in Fig. 8 is oriented to dispose the cross-hairs in N, S, E, W direction.

In order to determine the precise bearing and distance between the true and assumed positions of the observer, as indicated by the ball pattern with respect to the center of the plug, the locking plunger 187 is lifted, and the carrier 171 is rotated to dispose the cross-hairs, extending the direction of the pointers 171a, directly over the mean point of the ball impact pattern 189. The pointers will now indicate on the scale 185 and 182, the true bearing direction or position of the observer from the assumed position at the time of collimation of the selected stars, when the primary vertical reference 75 was assumed to be vertical. Since the micrometer shaft 173 is parallel to the line between the pointers, rotation of the knob 174 displaces the cross-hairs in the bearing direction observed. When the other or transverse cross-hair is moved to a position bisecting the mean impact point, the distance in degrees and minutes between the assumed and true position of the observer in the bearing direction can be directly read on scales 181, 174a and 175, indicating the distance in degrees, minutes and fractions of minutes which is directly converted to nautical miles.

In order to utilize my instrument it is necessary to have, or precalculate, the following information:

1. The sidereal hour angle of the selected primary navigational body.
2. The declination of the primary body.
3. The position angle of the selected secondary body with respect to the primary body, measured clockwise around the primary body from its celestial meridian.
4. The separation angle between the selected primary and secondary bodies.

The sidereal hour angle and declination of the primary body is readily available from the well known Air Almanac.

The position and separation angles between the primary and secondary bodies can be determined from their relative positions in the heavens, according to their Dec. and S. H. A., however, precalculated charts and data are available listing all navigation stars with their position and separation angles with respect to each other. A sample or small portion of such a chart is illustrated below, giving the Declination, position angle, and separation angles for five navigational stars, the complete table including the data necessary for setting the position angle and separation angle of the primary and secondary star image sighting axes of my improved navigational instrument with respect to the equinoctial reference and meridian of the primary navigational stars, for more than 1,800 different navigational bodies.

*Companion or secondary stars*

| Primary Star | Dec. | Acamar | Achernar | Acrux [1] | Adhara | Sirius |
|---|---|---|---|---|---|---|
| Acamar | S-40°-31' |  | 210°-30' 21°-21' | 162°-45' 72°-16' | 96°-17' 49°-46' | 81°-10' 54°-05' |
| Achernar | S-57°-31' | 045°-55' 21°-21' |  | 170°-29' 58°-54' | 98°-50' 60°-49' | 88°-04' 68°-56' |
| Acrux | S-62°-48' | 209°-33' 72°-16' | 191°-12' 58°-54' |  | 262°-47' 60°-51' | 266°-26' 73°-04' |
| Adhara [1] | S-28°-54' | 239°-40' 49°-46' | 217°-19' 60°-49' | 148°-48' 60°-51' |  | 344°-49' 12°-40' |
| Sirius | S-16°-39' | 231°-37' 54°-05' | 214°-04' 68°-56' | 151°-33' 73°-04' | 166°-09' 12°-40' |  |

[1] Note: The first angle listed under each companion or secondary star, in line with the primary star, is its position angle, while the second angle listed is the separation angle, or angular distance between the two stars.

Assume that the two stars selected from the chart of known or precalculated position and separation angles are Acrux and Adhara. Both stars have a south declination, but it is immaterial which star is selected as primary star. Assuming also that Adhara is selected for the primary star with the observer somewhere in the Northern Hemisphere, fairly close to the equator, the declination micrometer 41 of the instrument would be rotated to adjust the Dec. angle of the primary sighting axis of the telescope 19, with respect to the reference face 3 of the equinoctial reference block or support 1, to 28°-54', indicated in degrees, using the red figures, on the drum 43, as observed through the window 42 in connection with minutes and degrees indicated by the red figures on the scale 41a of the adjusting knob 41.

Since the observer is in the Northern Hemisphere and since the postion angle of Acrux with respect to Adhara is indicated at 148°-48' and the separation angle is 60°-51', the position angle gear or secondary star collimating support 36 is rotated to dispose the white 148° and 48' indications of the gear and micrometer knob at the respective lubber lines 55 and 54a, the separation angle knob 65 being adjusted to tilt the prism 57 to a separation angle of 60° and 51' as indicated on the separation angle indicating counters 66.

The above three settings of the instrument do not vary materially with time, changing only from epoc to epoc, so this setting may remain fixed, so to speak, as long as the same two stars are used. By sighting the primary star directly through the telescope 19 on the cross-hairs 24 and rotating the instrument around the primary sighting axis, the secondary star image will at some time move across the telescope field into collimation with the image of the primary star. When this collimated observation of the star images occurs the tilt plane of the telescope will be in the meridian of the primary star, the equinoctial reference 3 will be parallel with the celestial equator and the polar axis P. A. will point directly to the celestial pole.

In order to determine an assumed latitude between the equator and the observer, assuming that his geographical position is north of the equator with the observations being made toward the south, the observer may preset his assumed position directly into the instrument by manipulation of the micrometer knob 101, which adjusts the angle between the equinoctial reference and the axis of the vertical reference member 75 to an assumed vertical as indicated by the latitude indicia on the latitude segment 93 and on the knob 101. If the observer is in the Southern Hemisphere within 10° of the equator, the latitude may be preset by using the short scale 94a on the latitude segment 93. Beyond this southerly latitude, it is necessary to reset the instrument so that when the images of the two stars are superimposed in the telescope axis the equinoctial reference 2 will be parallel with the celestial equator and facing toward the elevated pole which in this case would be the South Pole. This resetting, for use in the Southern Hemisphere, requires the use of scales opposite from those used in the Northern Hemisphere, in case of south declination the white scale and in the case of the position angle the red scale. The short scale may be used in lieu of a complete resetting when the instrument is to be used intermittently on both sides but within 10° of the equator.

The operator may also preset his assumed local hour angle on the instrument by manipulation of the knob 88, as indicated by the white indicia on the scale 80a on the rear face 3 of the equinoctial reference block and on the knob 88 with respect to the respective lubber lines 79a and 89. This sets the vertical reference member in an assumed vertical in the transverse coordinate for the observer's assumed geographical position with respect to the meridian of the primary star, for the time at which the observation is to be made. The local hour angle of the primary body from the observer's assumed longitude is measured to the west from 0° to 360° and is set into the instrument using the white indicia 80a when the observer is in the Northern Hemisphere, or in the Southern Hemisphere within 10° of the equator and using the short latitude scale 94a. If in the Southern Hemisphere and using the long latitude scale 94, the observer sets the assumed West L. H. A. into the instrument using the red indicia 80b and red figures on the L. H. A. micrometer knob 88.

Before determining the true position of the observer it should be noted that if the latitude and local hour angle adjustments are not made before the observation, the operator may sight the primary star, rotate the telescope to bring the secondary star image into coincident position with the primary star, while holding the button 109a of the vertical reference latch disengaging microswitch 109 depressed, causing the operating circuit to maintain the two magnets 92 and 105 energized to hold the two adjusting worms 95 and 99 in disengaged relation with respect to the respective teeth 100 of the latitude segment 93, and the teeth of the L. H. A. gear member 76, permitting the vertical reference member 75 to freely swing or gravitate to an assumed vertical reference position. The observer, by releasing the holding pressure on the micro-switch button 109a, while maintaining the images of the two stars in precise alignment through the telescope, simultaneously breaks the holding circuit to the two magnets, permitting the two worms 85 and 99 to instantly and simultaneously move to their normal locking relations with the teeth of the latitude and L. H. A. indicating members 93 and 76, thus locking the vertical reference member 75 in a vertical position for the collimated observation through the telescope of the images of the selected stars and the indicia on the scales 80 and 94 will indicate the observer's position, or approximate position, as to latitude and L. H. A.

It should be noted that even though the images of the stars as viewed through the telescope were not in precise alignment at the time the vertical reference member was locked, by the observer's release of the button 109a, the scales 80 and 94 will indicate an approximate or assumed latitude and L. H. A. which is reasonably close to the true geographical position of the observer. Should the observer be able to superimpose the images of the two stars precisely, and if the vertical reference 75 has gravitated to a precise vertical position at the time the vertical reference was locked, the scales 80 and 94 would indicate the exact latitude and L. H. A. position of the observer. The L. H. A. so determined is combined, in a manner customary to the usual practice of the art, with the Greenwich hour angle of the primary body for the purpose of determining longitude. It should be noted that the L. H. A. read from the instrument is always west. If the observer is in the Northern Hemisphere the white indicia 80a are used, if in the Southern Hemisphere the red indicia are used.

With the images of the stars are brought into precise alignment in the sighting axis of the telescope and the vertical reference member 75 in true vertical position a ball 117, when released by the observer by manipulation of the ball release or trip lever 126, will fall through the still air within the casing 111 of the primary vertical reference means 75 from the universal tilting center of the vertical reference means on a line coincident with the center or vertical axis of the vertical reference means and will strike the carbon ribbon 155 at a point directly above the precise center of the oriented removable position recording plug 157, the impact of the ball on the ribbon 155 causing the ribbon 155 to record the impact point or vertical line of fall on the recording surface 159 of the plug 157 at the exact center of the plug.

In using the instrument, especially on a fast moving vehicle or craft, such as an airplane, it is unlikely that the primary vertical reference member can be locked at the precise vertical while simultaneously aligning the images of the stars for several reasons, such as vibration, slight friction of the tilt bearings, etc., so the position of the observer at the time of the sighting and superimposing of the star images and locking of the vertical reference usually indicates an approximate or assumed position, with respect to the celestial sphere, and also with respect to Greenwich meridian and the equator for the time of collimation.

Usually the vertical reference is locked in a vertical position for the assumed location of the observer with respect to his L. H. A. and Latitude for the time that the observation is to be made, or a preobservation is made with the star images superimposed on each other in the telescope axis while manipulating the vertical reference release and locking button 109a to lock the vertical reference member and the time of this observation is noted or recorded, the scales 94 and 80 indicating the latitude and L. H. A. for the assumed position of the observer at this preobservation. The L. H. A. indicated by the scales 80 and 88 of the instrument is converted to longitude by subtracting it from the G. H. A. of the primary body, first adding 360° to the G. H. A. if necessary. The remaining longitude is west longitude, if greater than 180° it must be subtracted from 360° to give east longitude.

The observer now superimposes and centers the images of the selected stars in the telescope axis as carefully as possible, manipulating the trigger 126 each time the images of the stars are in alignment with each other and the cross hairs of the telescope until a sufficient number of balls have been dropped to assure a mean impact point of the balls on the recording surface 159 of the plug 157 of the secondary vertical reference means representative of a true vertical for the observer's position.

Assuming that thirty or more balls are dropped by the observer, over a very short period of time, during the simultaneous observation of the selected stars, the pattern or group impact points recorded on the end of the plug 157 will have a mean point which is displaced from the center of the plug on an arc having a radius equal to the distance from the recording surface of the plug to the tilt center of the primary vertical reference, and ball release point, this arc equaling the distance in degrees, minutes and seconds between the assumed geographical position of the observer and his true geographical position, the radial direction of the mean impact point from the center of the plug indicating, and recording, the bearing or direction of the observer from his assumed location.

By removing the plug 157 from the primary vertical reference member 75 and inserting the same in the tapered recess 170 in the cover plate 167, of the reading stand in oriented relation, rotation of the carrier 171 disposes the cross-hairs 179 which are parallel with the micrometer screw 173 across the mean impact point of the recorded ball pattern 189. By noting the direction or bearing of the cross-hairs, as indicated by the pointers 171a and 171b projecting from the carrier plate 171 with respect to north-south bearing indication on the fixed scale 185 of the cover plate, the bearing or direction of the mean impact point from the center of the plug is determined. Manipulation of the micrometer or indexing knob 174 on the micrometer worm 173 disposes the transverse cross-hairs across the mean point of the ball pattern on the plug 157 and directly indicates the number of degrees and minutes of arc between the center of the plug 157 and the mean impact point in the aforesaid bearing direction. Since the relation of the pointer on the movable cross-hair carrier 176 actuated by the worm 173 with respect to the upstanding bracket 172, indicates degrees of displacement of the cross-hairs and each division of the micrometer knob scale indicates a movement indicating a minute of arc, while the vernier indicates one-tenth of a minute of arc, and since each minute of arc indicates one nautical mile, the distance between the true and assumed position of the observer is recorded in minutes of arc, or miles and fractions on the recording plug surface 159 as indicated above.

Unless the observer makes his observation at the exact time for which the L. H. A. was computed or if a preobservation was made to determine the approximate vertical position of member 75 relative to the collimated and oriented instrument, it is necessary because of the diurnal motion of the stars to make an additional correction to the longitude determined by the instrument. The longitude is corrected one minute of arc for every four seconds of time difference between the time of actual observation and the time the L. H. A. was computed or assumed or the time the preobservation was made. If the actual observation was later the longitude is corrected westwardly; if it was earlier, the correction is eastwardly.

Reference is now made to Figs. 12 and 13, showing a slightly modified form of secondary or true vertical reference recording member 157a having a recording surface 159a, on which is finely inscribed North, South, East and West bearing lines and certain intermediate bearing or direction lines, as best seen in the sectional view, Fig. 13, through the transparent recording end 157b of the plug. Distance indicating circles 157c are also finely inscribed on the recording end of the plug concentric to the center of the plug, the distance between each circle indicating the angle measured in minutes of arc between the circle and the vertical axis of the vertical reference member 75 when the plug is inserted therein. Each circle, for instance, indicating one-twelfth of a degree of tilt of the vertical reference member from the vertical, indicating five nautical miles.

A suitable magnifying objective lens system 157d is adjustably positioned for focusing, in an axial bore 157e formed in the lower portion of the recording plug, for obtaining a highly magnified image of recording surface 159a through the transparent end 157b of the plug.

After the ball impact pattern has been recorded on the end of the plug, the observer has only to remove the plug 157a from the vertical reference member 75, and hold the plug with the recording surface 159a toward a suitable source of illumination, while looking through the magnifying objective lens system 157d, to determine his bearing direction and the distance from his assumed position as represented by the center of the surface 159a, to his true position, indicated by the relation of the mean impact point of the ball pattern with respect to the indicating circles and lines 157c and 157f. The concentric circles 157c are inscribed with fine identifying numbers increasing radially from the plug center, indicating the distance in minutes or nautical miles, while the North, South, East, West and intermediate coordinates 157f are also lettered around the periphery of the surface 159a, so that the observer can identify the rings 157c and bearing lines 157f while noting the position recorded ball impact pattern.

Reference is made to Fig. 14 showing a modified type of secondary star sighting and collimating head 236 consisting of two objective lenses of different focal lengths and a common eye-piece lens system, in which magnifying means are provided for magnifying the light intensity from the secondary star, means being also provided for reducing the light intensity from the primary body, as observed through the primary star sighting axis. In this figure of the drawings the outer end portion of the primary star sighting means is indicated at 219, and is similar to the telescope 19 in Fig. 1, including the sighting objective and cross-hairs, although the magnification of the primary body may not be necessary or incorporated, if the sun is to be used as the primary body.

The collimating head 236 is also similar, in construction and operation, to the collimating head 36 in Fig. 1, and juxtaposed right-angle prisms 256b and 256c fixed thereon, with the semi-silvered reflecting surface 256d interposed therebetween, constituting a split cube prism 256a, is similar to the split cube prism 56a. The inclined semi-reflecting surface of the split cube prism is reversed, however, and the prism positioned inwardly toward the observer's end of the instrument with respect to the position of the adjustable right-angle prism 257 on the corner 259. Provision is made for the adjustment of the prism 257 to the separation angle between the selected bodies by manipulation of the knob 265 in the same manner as by the knob 65 in Fig. 1.

The image from the secondary body is reflected in a plane, transversely across the primary star sighting axis T. S. A., in front of the split cube prism 256b and 256c, to a 45°–45° roof prism 257a, located at the opposite side of the primary star sighting axis, the roof prism 257a reflecting the star image twice at right-angles, and back to the semi-silvered surface 256d of the split cube prism, into the primary star sighting axis in a plane at right-angles thereto, in the same manner as the secondary star sighting axis in the preferred form in Figs. 1 to 4, is reflected into collimation with the primary star axis.

A suitable magnifying lens system, including a wide diameter lens 257b, interposed between the tiltable prism 257 and the split cube prism, for magnifying the light intensity from the secondary body after it leaves the right-angle prism 257 and before it reaches the inclined semi-reflecting surface 256d of the split cube prism 256a.

The sun-shade 233 is mounted on the side of the separation angle gear box 256, having different light intensity filters or discs therein, shiftable incident to rotative adjustment of the sun-shade, into the primary star sighting axis in front of the split cube prism 256a as shown in Fig. 14.

In using this form of the invention it is possible to bring the images of two heavenly bodies into coincident sighting alignment in the daytime, making it possible for the observer to find his position at anytime, day or night, when the selected navigational bodies are visible.

If the sun is the selected primary body, the sun-shade will be rotated to decrease the light intensity of the primary body below that of the magnified illumination of the secondary body image. By centering the dimmed image of the sun or primary body on the cross-hairs of the telescope 219 and rotating the scope, assuming that the position and separation angles of the secondary body sighting axis have been adjusted, as described in connection with the preferred form, the magnified light image of the secondary body can be observed and brought into alignment with the light image of the sun or the brighter body. When the two bodies are centered with the cross hairs in the telescope the procedure is the same as in the preferred form. The position of the ordinary vertical reference member determines the assumed or rough latitude and L. H. A. of the primary body while the ball pattern from the secondary vertical reference member gives the true position, in distance and direction from the assumed position.

My improved navigational instrument also provides effective celestial navigational means for aircraft navigators, for measuring the total wind velocity and direction of the wind for the time of an air plot.

When the observer knows his true position, either from D. R. (direct reckoning) or from a radio compass fix, and after a given time period, such as an hour, knows from the compass bearing and his air speed, where he should be at the end of the time period and presets the instrument for that position, the position of the mean impact point of the balls, dropped during the two star "fix" at that time, with respect to the center of recording surface will indicate the direction or bearing of the wind, and the mean nautical miles per hour of the wind during the time period.

While I have shown and described a preferred embodiment of my invention, and certain modifications, it will be evident that various other modifications and changes may be resorted to without departing from the spirit of this invention as defined by the appended claims.

I claim:

1. In a celestial navigation or surveying instrument, a support, adjustable primary star sighting means carried by the support, means for adjusting the primary star sighting means to the declination of the primary star, with reference to a predetermined reference position of the support, secondary star sighting means adjustably carried by said primary star sighting means, means for adjusting and presetting the position of the secondary star sighting means with respect to the primary star sighting means to the known degree of angular separation between the two selected stars and the position angle between the second star and the first star as measured from the meridian of the first star, to collimate the image of the second star with the image of the primary star while observing the primary star, primary vertical reference means universally mounted and adjustably carried by said support, means between the primary vertical reference means and the support for presetting the primary vertical reference means to an assumed vertical with respect to both said support and the primary and secondary star sighting means to indicate the assumed or best known latitude of the observer and the assumed Local Hour Angle of the primary star for the time of the observation; and secondary gravity determined vertical reference means carried by said primary vertical reference means for both determining the variations between the assumed vertical and the true vertical at the time of collimation of the primary and secondary star images relative to the said assumed vertical reference representing the observer's assumed, approximate, or best known position, and determining directly the variations in angular distance and direction between the preset assumed vertical position of the primary vertical reference and the true gravity determined vertical indication of the secondary gravity determined vertical reference means at the time of the collimated observation of the two star images.

2. A navigational instrument of the two star image collimating type comprising a portable equinoctial reference support, primary star sighting means adjustably carried by the equinoctial reference support, adjusting means between the support and the primary star sighting means for preadjusting the sighting axis of the primary star sighting means, with respect to a predetermined equinoctial reference position of the support, to the known declination of any selected navigational star, secondary star sighting means rotatable about the axis of the primary star sighting means in a plane perpendicular thereto, and angularly adjustable with respect to the primary star sighting axis, means between the primary star sighting means and the secondary star sighting means for presetting the secondary star sighting axis with respect to the primary sighting axis, in accordance with the known angular separation between the selected primary star and any selected secondary navigational star and the known position angle between the meridian of the primary selected star and the arc of the great circle passing through said primary star and the selected secondary star, to permit collimation of the secondary star image with the primary star image during the sighting of the primary star, observer's geographical position determining means carried by said support comprising an adjustable vertical reference, adjusting means for preadjusting the position of said vertical reference to indicate an assumed vertical at the time of collimation of the said selected stars, calibrated indicia on said adjusting means between the assumed vertical reference and the support for presetting the assumed vertical reference with respect to the support and the star sighting means to indicate the assumed Local Hour Angle of the observer computed from the Greenwich Sidereal Time or Greenwich Hour Angle, first point of Aries, the Sidereal Hour Angle of Right Ascension of the primary star and the observer's assumed longitude, latitude indicating adjusting means between the equinoctial support and the assumed vertical reference for presetting the position of the assumed vertical reference in accordance with the assumed or best known latitude at the time of collimation of the primary and secondary star images, true vertical indicating means carried by said assumed vertical indicating means for indicating the true vertical at the time of collimation of the primary and secondary star images, and calibrated indicating means between said assumed vertical indicating means and said true vertical indicating means for indicating variations in direction and distance between the assumed position indicated by the assumed vertical reference and the true geographical position as indicated by the true vertical reference indicating means.

3. In a celestial navigation, position determining instrument, a support having an equinoctial reference position, primary star sighting means angularly adjustable on the support in a plane at right angles to said equinoctial reference position for sighting any selected primary navigational star, calibrated adjusting means between the support and the primary star sighting means for adjusting the sighting axis of the primary star sighting means with respect to said equinoctial reference, to the known declination of the primary star, secondary star sighting means rotatably carried by the primary star sighting means adjustable about the sighting axis of the primary star sighting means and angularly adjustable in any plane passing through said primary star sighting axis for sighting and collimating said secondary star image with the primary star image through said primary star sighting means, calibrated adjusting means between the primary star sighting means and the secondary star sighting means for preadjusting the rotative position of the secondary star sighting means to the known position angle around the primary star sighting axis, between the meridian of the primary star and the arc of the great circle connecting the primary and the secondary star, calibrated adjusting means between the primary star sighting means and the secondary star sighting means for adjusting the position of the sighting axis of the secondary star sighting means relative to the sighting axis of the primary star sighting means to the known degree of angular separation between the primary and the secondary stars, an adjustable assumed vertical reference carried by said equinoctial reference support, calibrated adjusting means between the said equinoctial reference support and said assumed vertical reference support for preadjusting said assumed vertical reference in the plane of the observer's assumed meridian for indicating the assumed or best known geographical latitude of the observer, means for presetting the assumed vertical reference in a plane at right angles to the aforementioned presetting of the observer's assumed latitude with reference to the equinoctial support to indicate the angle between the meridian or hour circle of the primary star and the observer's assumed meridian, calibrated true vertical reference means carried by the assumed vertical reference means for indicating variations in direction and distance between the assumed geographical position of the observer, indicated by the preset assumed vertical, and the true geographical position of the observer indicated by the true vertical reference means at the time of collimation of the secondary star image with the primary star image.

4. In a geographical position finding celestial navigation or surveying instrument, an equinoctial reference position support, primary star sighting telescope means adjustably carried by the support to tilt in a plane perpendicular to the reference support, means for adjusting the sighting axis of said primary star sighting telescope means with respect to said equinoctial reference support to the known declination of any selected primary navigation star, a secondary star collimating head rotatably carried by said telescope means to rotate about the sighting axis of the primary star sighting means, including adjustable optical means carried by said head to rotate therewith, and angularly adjustable with respect to the primary star sighting axis and said head, in a plane extending through the sighting axis at right angles to the plane of rotation of the collimating head, for sighting and collimating the image of any selected secondary navigational star, located within a 90° separation angle from the primary star, with said primary star image through said primary star sighting telescope means, calibrated position angle determining adjusting means between the primary star sighting telescope means and said collimating head for adjusting the rotative position of the collimating head with respect to the tilting plane of the primary star sighting telescope means, to position the said angular adjustment plane of the secondary star sighting axis which extends through the sighting axis, to a position angle identical with the known position angle between meridian of the primary star and the angular location of the secondary star about the sighting axis of the primary star from the meridian of the primary star, calibrated adjusting means carried by said head, between the same and the secondary star sighting means for adjusting the angular relation thereof with respect to the primary star sighting axis to the degree of known angular separation between the primary star and the secondary star, whereby the image of said secondary star may be collimated with the image of the primary star while sighting the primary star and rotating the instrument about the primary star sighting axis to bring the secondary star image into coincidence with the primary star image and simultaneously position said equinoctial reference parallel with the earth's equator and perpendicular to a true north-south line joining the poles of the celestial sphere at the time of collimation, and means for simultaneously determining the true vertical at the observer's geographical position during said collimation, independently of said collimating operation.

5. In a geographical position finding celestial navigating instrument, a support having an equinoctial reference, primary star sighting telescope means adjustably carried by the support, means for adjusting the sighting axis of said primary star sighting means with respect to the support and said equinoctial reference to the known declination of any selected primary navigation star, a secondary star collimating head rotatably carried by said telescope means, to rotate about the sighting axis of the primary star sighting means, including secondary star sighting means carried by said head to rotate therewith and angularly adjustable with respect to the primary star sighting axis, in a plane extending through the primary star sighting axis, at right angles to the rotative plane of the secondary star collimating head, for sighting any selected secondary navigational star, within a 90° arc of the primary star, and collimating the secondary star image with the image of the said primary star through said primary star sighting means, calibrated position angle determining adjusting means between the primary star sighting telescope means and said collimating head for adjusting the rotative position of the collimating head with respect to the tilting plane of the primary star sighting telescope means, to position the angular adjustment plane of the secondary star sighting means, to the known position angle between meridian of the primary star and the rotative angular location of the secondary star about the primary star sighting axis, calibrated adjusting means carried by said head, between the same and the secondary star sighting means, for adjusting the angular relation thereof with respect to the sighting axis, to the degree of known angular separation between the positions of the primary star and the secondary star, whereby the image of said selected secondary star may be collimated with the image of the primary star through the sighting telescope means by sighting the primary star, rotating the instrument about the primary star sighting axis to bring the secondary star image into coincidence with the primary star image, with said equinoctial reference disposed parallel with the earth's equator and at right angles to the polar axis of the celestial sphere at the time of collimation, and means for simultaneously determining the true vertical at the observer's geographical position, comprising vertical position indicating reference means carried by the equinoctial reference support for recording the true vertical at the observer's geographical position at the time of observation and collimation of the images of the primary and secondary stars, and geographical position indicating means between the equatorial reference support and the vertical position indicating means for directly indicating the observer's geographical position at the time of said collimated observation.

6. In a geographical position finding navigational instrument, a support having a celestial equator reference position, adjustable star sighting means carried by said support to swing in a plane perpendicular to said celestial equator reference, calibrated adjusting means operable between the support and sighting means for adjusting the sighting axis of said star sighting means with respect to said celestial equator reference to the known declination of any known selected primary navigational body, a rotary collimating head carried by said star sighting means to rotate about the said sighting axis, including adjustable secondary body sighting means carried by said head for sighting and collimating the image of any known secondary navigational body within a 90° separation angle of the primary body with the image of the primary body, calibrated adjusting means between the first mentioned star sighting means and the collimating head for angularly adjusting the head about the first star sighting axis to dispose the adjustment plane of the secondary body sighting means in the plane of the known position angle between the meridian of the first body and the location of the second body in the heavens, calibrated adjusting means between the head and the secondary body sighting means for adjusting the sighting axis thereof for the secondary body, with respect to the primary sighting axis, to the degree of angular separation between the first and said second bodies, a gravity operated vertical reference carried by said celestial equator reference support for obtaining a vertical reference during the collimation of the bodies at the time of observation, and geographical position indicating means between the support and said vertical reference for indicating the geographical position of the observer, in terms of latitude and local hour angle of the first body incident to the vertical position of the gravity operated vertical reference with respect to said celestial equator reference at the place of the observer.

7. In a celestial navigation position finding and surveying instrument, a portable support constituting a celestial equator reference adapted to be disposed parallel to the celestial equator, primary star sighting optical means tiltably carried by said support to move in a plane perpendicular to said celestial equator reference, indexing adjusting means between the support and said primary star sighting means for positioning the sighting axis of said star sighting means to the declination angle between the celestial equator and any known primary celestial body, optical secondary star sighting means rotatably carried by said primary star sighting means to rotate in a perpendicular plane about the primary star sighting axis and angularly adjustable in a plane passing through said primary star sighting axis, indexing means carried by said optical secondary star sighting means for adjusting the sighting axis of said secondary star sighting means to the known degree of angular separation between the primary selected celestial navigational body and any other secondary celestial navigation body in the heavens whose angular separation from the other selected body is known and within 90° of the primary body, indexing means between the primary star sighting means and said optical secondary star sighting means for adjusting the position angle of said secondary star sighting means around the primary sighting axis from the tilting plane of the primary star sighting means, to the position angle of the secondary celestial body measured from the meridian of the first body clockwise around the primary body sighting axis to the known location of the secondary body in space, for collimation of the image of the secondary body with the primary body through the primary star sighting means to dispose said celestial equator reference parallel with the celestial equator and perpendicular to the polar axis of the celestial sphere, vertical reference means carried by said support for universal free tilting movements relative to said primary star sighting and secondary star sighting means, indexing means between said vertical reference means and said support for determining latitude in the north-south direction plane and in the east-west plane, the local hour angle of the primary body from the true meridian of the observer, for the time of collimation, when said vertical reference is in true vertical position for the geographical location of the observer.

8. A celestial navigation position finding instrument, a portable support constituting a celestial equator reference adapted to be disposed parallel to the celestial equator, primary star sighting optical means tiltably carried by said support to move in a plane perpendicular to said celestial equator reference, indexing adjusting means between the support and said primary star sighting means for positioning the sighting axis thereof to the declination angle between the celestial equator and any celestial body whose position is known, optical collimating means having an adjustable sighting axis and rotatably carried by said primary star sighting means, to rotate in a perpendicular plane about the primary star sighting axis, and angularly adjustable in a plane passing through said primary star sighting axis, indexing means carried by said optical collimating means for adjusting the sighting axis of said collimating means to the known degree of angular separation between the first mentioned or primary selected celestial navigational body and any other second celestial navigation body in the heavens whose degree of angular separation from the other selected primary body is known, indexing means between the primary star sighting means and said optical collimating means for adjusting the position angle of the sighting axis of said collimating means around the primary sighting axis from the tilting plane of the primary star sighting means to the known position angle of the secondary celestial body, measured from the meridian of the first body clockwise around the primary body sighting axis to the known location of the secondary body in space, whereby collimation of the image of the secondary body with the primary body through said primary star sighting means disposes said celestial equator reference parallel with the celestial equator and at right angles to the polar axis of the celestial sphere, vertical reference means carried by said support for free universal tilting movements relative to said star sighting and optical collimating means, indexing means between said vertical reference means and said support for determining latitude in the north-south direction plane and the local hour angle of the primary body for the assumed geographical position of the observer in the east-west direction plane, at the time of collimation of the secondary body image with the image of the primary body, when said vertical reference is in true vertical position, locking means between said portable support and the vertical reference for presetting said vertical reference means in an assumed vertical position for the geographical position of the observer, to indicate an assumed geographical position of the observer for the time of the collimated observation of the images of the primary and secondary bodies, and supplemental gravity controlled true vertical reference means carried by the aforesaid vertical reference means for indicating the true vertical during the collimated observation of the images, and indexing means between the first mentioned vertical reference means and said supplemental vertical reference means for directly determining the difference between the assumed and true verticals in terms of the variations in local hour angle and latitude between the assumed geographical position of the observer, indicated by said assumed vertical and the true geographical position of the observer at the time of the observation indicated by said variations between the secondary vertical reference means and the true vertical reference means at the time of the collimated observation of the primary and secondary body images.

9. In a celestial navigation instrument, a portable support constituting equinoctial reference means, a star sighting telescope tiltably journalled on said support to swing in a plane perpendicular to said equinoctial reference means, declination indexing adjusting means between said support and said telescope for adjusting the telescope to dispose the sighting axis thereof, with respect to the equinoctial reference means, at the known declination of any primary selected celestial navigational body, a collimating head rotatably journalled on said telescope about said sighting axis in a plane perpendicular to said sighting axis, including collimating means carried by said head to rotate therewith, having a secondary body sighting axis adjustable in a plane parallel to said sighting axis and perpendicular to the rotative plane of the head, indexing adjusting means between said head and said collimating means for adjusting the angular relation between the telescope sighting axis and the secondary body sighting axis of said collimating means, for any selected secondary navigational body, within 90° of the primary body, to the known degree of angular separation between the selected primary and secondary navigational bodies, indexing adjusting means between said telescope and said head for adjusting the position angle of the tilting plane of the secondary body sighting axis with respect to the tilting plane of the primary star telescope sighting axis to the known position angle between the meridian of the primary body, measured clockwise through 360° around the primary body from that portion of its meridian nearest the north pole, to the position of the secondary body in the heavens, whereby collimation of the images of the two bodies through the telescope at any time or geographical location, disposes the equinoctial reference support in a plane parallel to the celestial equator and at right angles to the celestial sphere's polar axis, geographical position indicating assumed vertical reference means tiltably carried by said support for free universal tilting movements to obtain an assumed vertical reference position at the observer's location, latitude position indicating indexing means between the support and said tiltable vertical reference means for adjusting the vertical reference to a vertical position in the assumed meridian of the observer for the time of the simultaneous collimated observation of the images of the selected primary and secondary bodies, local hour angle indicating indexing means between said support and the assumed vertical reference means for adjusting the position of said vertical reference means to a vertical position for the assumed or best known local hour angle of the primary star for the time of collimated observation of the two bodies, true vertical recording reference means carried by the assumed vertical reference means, and true geographical position indicating indexing means between the assumed vertical reference means and said true vertical reference means for indicating the bearing direction between the assumed geographical position of the observer, as indicated by the assumed vertical reference indexing means, and the true geographical position of the observer as indicated by the degree of angular variation between said assumed and true vertical reference means at the time of collimation of the images of the two bodies, and means for indicating the distance in the said bearing direction from said assumed position of the observer to his true geographical position due to the degree of angular variation in the vertical between the assumed vertical of the assumed vertical reference means and the true vertical indicated by the true vertical reference means.

10. In a two star collimating celestial navigation instrument, a portable support having an equinoctial reference position, a star sighting telescope having a star image centering and collimation axis, tiltably journalled on said support to tilt in a plane perpendicular to the plane of the said equinoctial reference position of the support, manually settable indexing means between said support and said telescope for adjusting the same to position the star centering and collimation axis thereof to the known declination angle of any selected celestial navigational body, a rotary support carried by said portable support and journalled thereon to rotate about the said star centering and collimation axis in a plane perpendicular to said axis, secondary star sighting means adjustably carried by said rotary support for collimating the image of the secondary body with the image of the primary body and having a secondary star sighting axis, disposed for angular adjustment thereon in a plane parallel to the star centering and collimation axis of the telescope and perpendicular to the rotative plane of said rotary support, manually adjustable indexing means between said rotary support and the secondary star sighting means for adjusting the angular relation between the primary star centering axis and the secondary star sighting axis to the degree of known angular separation between the two selected navigational bodies, manually adjustable indexing means between the telescope and said rotary support for adjusting the rotary support about the primary star centering axis to position the tilting plane of the secondary star sighting axis in any angular plane perpendicular to the rotative plane of said rotary support, equal to known position angle of the second body, measured from the north celestial pole end of the meridian through the first body, around the first body to the known position angle of the second body in the heavens, whereby collimation of the two selected bodies by the observer through the telescope disposes the equinoctial reference of the support parallel to the celestial and geographical equators, and perpendicular to the polar axis of the celestial sphere, a vertical reference support rotatably carried by said equinoctial reference support on an axis perpendicular to said equinoctial reference plane and perpendicular to the tilting axis of said primary star sighting telescope, gravity operated vertical reference means tiltably journalled on said vertical reference support to swing perpendicular to the rotative plane of said vertical reference support, whereby the said gravity operated vertical reference member can assume a geographical vertical reference position in terms of latitude and local hour angle of the primary star at any geographical position of the observer while collimating the image of the selected secondary navigational body with the image of the primary navigational body through the telescope, releasable locking means between the equinoctial reference support and the gravity operated vertical reference member for locking the said gravity operated vertical reference member in a gravitated vertical reference position while collimating said navigational bodies, local hour angle position indicating means operable between said gravity operated vertical reference support and said equinoctial reference support incident to movement therebetween for indicating the local hour angle position of the observer during the collimation of the image of the secondary body with the primary body image when the vertical reference is vertical in the meridian of the observer, and latitude position indicating means operable between the vertical reference support and said gravity operated vertical reference member, indicating the latitude of the observer during the collimation of the images of the bodies when the gravity operated vertical reference is vertical in the meridian of the observer and vertical in a transverse plane perpendicular to the meridian of the observer and passing through his position.

11. In a two star collimating position and direction finding instrument, a portable support having an equinoctial and polar axis reference position, a primary star sighting telescope journalled thereon to tilt about a fixed axis perpendicular to the equinoctial and polar reference positions of said support, manually settable indexing means between the support and said telescope for adjusting the tilt angle of the telescope with respect to said equinoctial and polar reference position of the support to dispose the sighting axis of the telescope at the known declination of any selected primary navigational body, a secondary star sighting head journalled on said telescope to rotate about the telescope sighting axis in a plane perpendicular to said sighting axis and parallel to said tilt axis, secondary star sighting means carried by said head comprising a diagonally split cube prism fixedly disposed on said rotatable head, across the primary star sighting axis, having a partially silvered reflecting surface therein disposed in a 45° inclined relation to the primary star sighting axis, in a plane at right angles to a plane passing through said primary star sighting axis, a right angle reflecting prism adjustably carried by said head to tilt about a fixed axis on the head, located in a plane parallel to said primary star sighting axis and in a second intersecting plane extending through the split cube prism and said reflecting prism at substantially right angles to said sighting axis, whereby predetermined rotative adjustment of said head and angular adjustment of said right angle reflecting prism on its axis, to the degree of known angular separation between any selected secondary navigational body and the primary body, and to the position angle between the meridian of the first body measured clockwise through 360° around the first body to the second body disposes the secondary star sighting means in position for collimating the image of the secondary body with the image of the primary body in the primary star sighting axis, indexing adjusting means between said right angle prism and the head for adjustably inclining the same with respect to the primary sighting axis to dispose the secondary star sighting axis extending from the right angle prism toward the secondary body at the degree of known angular separation between the selected bodies, indexing adjusting means between the primary star sighting telescope and the rotatable head for adjusting the position of the head to dispose the tilting plane of the secondary star sighting axis at the position angle between the merdian of the primary body and the position of the secondary body, measured from said meridian clockwise through 360° around the primary body to the secondary body with respect to the primary sighting axis and the polar and equinoctial position of the support, a primary vertical reference support rotatably journalled on said portable support about the said polar axis reference, gravity operated primary vertical reference means pivotally carried by said primary vertical reference support to swing therewith, and in a plane parallel to the axis of said vertical reference support on an axis perpendicular to the axis of said vertical reference support axis and perpendicular to the plane of movement of said primary vertical reference support whereby said vertical reference means can assume a vertical position independently of the position of the equinoctial and polar axis reference support during the collimation of the images of the bodies, "local hour angle" indicating means between the equinoctial and polar axis reference support and said vertical reference support for indicating the relative local hour angle position between the equinoctial and polar axis reference support and the position of the vertical reference support about its axis at the time of collimation of the two images of the bodies, and latitude indicating means between the vertical reference support and the vertical reference means for indicating the relative latitude position between equinoctial reference position of the support and the geographical position of the observer, indicated by the vertical position of the vertical reference on the vertical reference support at the time of collimation of the images of the bodies.

12. In a two star collimating position and direction finding instrument, a portable support constituting equinoctial and polar axis reference means, a primary star sighting telescope journalled on said support to tilt about a fixed axis perpendicular to the equinoctial and polar axis reference means, manually settable indexing means between the support and said telescope for adjusting the same with respect to said equinoctial and polar reference means to dispose the sighting axis thereof at the known declination of any selected primary navigational body, a secondary star image sighting head journalled on said telescope to rotate about the telescope sighting axis in a plane perpendicular to said sighting axis and perpendicular to said telescope tilt axis, optical secondary star sighting means carried by said head, comprising a diagonally split cube prism fixedly disposed on said head, across the primary star sighting axis, having a partially silvered inclined reflecting surface between the split cube disposed in a 45° angular relation to the primary star sighting axis, in a plane at right angles to a plane passing through said primary star sighting axis, a 90° reflecting prism adjustably carried by said head to tilt about a relatively fixed axis on the head located in a plane parallel to said primary star sighting axis and in a second intersecting plane extending through the split cube prism and said 90° reflecting prism at right angles to said primary star sighting axis, whereby predetermined rotation of said head about the primary sighting axis and predetermined angular adjustment of said 90° reflecting prism about its axis, to the degree of known angular separation between a selected secondary navigational body and the primary navigational body, and to the position angle between the bodies measured clockwise through 360° around the primary body from its meridian to an arc joining the secondary body, disposes the sighting axis in position, for collimating the image of the selected secondary body with the image of the primary body in the primary star sighting axis, indexed adjusting means between said 90° prism and the head for tilting the 90° prism with respect to the primary sighting axis to position the secondary star sighting axis of the 90° prism at the degree of angular separation between the selected bodies, indexing adjusting means between the primary star sighting telescope and the rotatable head for adjusting the head to position the tilting plane of the secondary star sighting axis at the position angle, between the meridian of the primary body and the position of the secondary body measured from the primary body's meridian around the primary body to the position of the secondary body, a primary vertical reference support, rotatably adjustable on said portable support about an axis parallel to the said polar axis reference, gravity operated primary vertical reference means pivotally carried by said primary vertical reference support to swing with said vertical reference support and about an intersecting axis perpendicular to the axis of the vertical reference support and perpendicular to the vertical axis of the gravity operated vertical reference means, whereby said vertical reference means can assume a vertical reference position independently of the position of the equinoctial and polar axis reference support, "local hour angle" indicating means between the equinoctial and polar axis reference support and said vertical reference support, for indicating the relative local hour angle position between the meridian of the primary body and the vertical position of the vertical reference support about its axis at the time of collimation of the images of the bodies, latitude indicating means between the vertical reference support and the vertical reference means for indicating the relative latitude angle indicating position between the plane of rotative adjustment of the vertical reference support and the vertical position of the vertical reference means at the time of collimation of the images of the bodies, simultaneously operable locking means between said equinoctial reference portable support and said vertical reference support, and between said vertical reference support and said vertical reference means for simultaneously locking said vertical reference support and said vertical reference means to prevent movement thereof on said portable support, and manually operable actuating means connected to said locking means and carried by said portable support for simultaneously actuating said locking means at the time of collimation of said images of the bodies to lock said vertical reference support and said vertical reference means in their vertical reference positions.

13. In a two star image collimating position finding instrument, a portable support constituting an equinoctial and polar axis reference means, a primary star sighting telescope journalled on said support to tilt about a fixed axis perpendicular to the equinoctial and polar reference means, manually settable indexing adjusting means between the support and said telescope for adjusting the same with respect to said equinoctial and polar reference means to dispose the sighting axis thereof at the known declination of any selected primary navigational body, a secondary star sighting head journalled on said telescope to rotate about the telescope sighting axis in a plane perpendicular to said sighting axis and parallel to said telescope tilt axis, optical secondary star sighting means carried by said head, comprising a diagonally split cube prism fixedly disposed on said head, across the primary star sighting axis, having a partially silvered inclined reflecting surface between the split cube prism disposed in a 45° angular relation to the primary star sighting axis, in a plane at right angles to a plane passing through said primary star sighting axis, a right angle reflecting prism adjustably carried by said head to tilt about a relatively fixed axis on the head located in a plane parallel to said primary start sighting axis and in a second intersecting plane extending through the split cube prism and said right angle reflecting prism at substantially right angles to said primary star sighting axis, whereby predetermined rotative adjustment of said head about the primary star sighting axis and predetermined angular adjustment of said right angle reflecting prism about its axis, to the degree of known angular separation between a selected secondary navigational body and the primary navigational body and to the position angle between the bodies measured clockwise through 360° around the primary body from its meridian to the bearing of the secondary body disposes the sighting axis in position for collimating the image of the selected secondary body with the image of the primary body in the primary star sighting axis, indexed adjusting means between said right angle prism and the head for tilting the prism with respect to the primary sighting axis to position the secondary star sighting axis of the right angle prism at the degree of angular separation between the selected bodies, indexing adjusting means between the primary star sighting telescope and the rotatable head for adjusting the head to position the tilting plane of the secondary star sighting axis at the position angle, between the meridian of the primary body and the position of the secondary body measured from the primary body's meridian clockwise through 360° around the primary body to the arc of the great circle joining it to the secondary body, a primary vertical reference support rotatably adjustable on said portable support about the said polar axis reference, gravity operated primary vertical reference means pivotally carried by said primary vertical reference support to swing with said vertical reference support and about an intersecting axis perpendicular to the axis of the vertical reference support and perpendicular to the vertical axis of the gravity operated primary vertical reference means, whereby said primary vertical reference means can assume a vertical reference position independently of the position of the equinoctial and polar axis reference support, "local hour angle" indicating means between the equinoctial and polar axis reference support and said primary vertical reference support for indicating the relative local hour angle position between the meridian of the primary body and the vertical position of the vertical reference support about its axis at the time of collimation of the images of the bodies, latitude indicating means between the vertical reference support and the primary vertical reference means for indicating the relative latitude angle indicating position between the plane of rotative adjustment of the vertical reference support and the vertical position of the primary vertical reference means at the time of collimation of the images of the bodies and the latitude of the observer, and locking means between the equinoctial reference support and said vertical reference support for interlocking the said vertical reference support and said equinoctial reference support against relative movements, locking means between said vertical reference support and said primary vertical reference means for interlocking said vertical reference means to said vertical reference support, manually operable actuating means on said instrument, connected to both of said locking means, constructed and arranged to simultaneously actuate said locking means to lock the primary vertical reference in an assumed vertical position, in the meridian of the observer, while collimating the two images of the bodies, supplemental true vertical indicating and recording means carried by said primary vertical reference means for recording any variation at the time of collimation of the images of the two bodies, between the locked assumed vertical position of the primary vertical indicating position of the vertical reference means and the supplementary true vertical reference means comprising manually actuatable means carried by said primary vertical reference means for dropping a ball from the point of intersection of the tilting axis of the primary vertical reference means and the rotative axis of the vertical reference support, including a removable target plate having a bearing direction and angular distance determining indicia thereon, carried by said primary vertical reference means in predetermined oriented relation with respect to the direction of the polar axis of said polar axis reference means in a plane substantially perpendicular to the vertical axis of the primary vertical reference means, and below the release point for the ball, for recording the point of impact of the ball on said removable target plate relative to the vertical axis of the primary vertical reference means and the angular distance between the vertical assumed by the primary vertical reference means and the impact point of the vertically falling ball below the ball release means for directly recording the bearing direction of said impact point of the falling ball on said removable target plate with respect to the polar axis reference means and recording the angular distance between impact point of the falling ball and the vertical assumed by the primary vertical reference when the latter is locked and during the collimation of the images of the two bodies.

14. In a two star image collimating geographical position finding instrument, a portable support having equinoctial and polar axis reference means, a primary star sighting telescope having a star sighting axis and adjustably carried by said portable support to tilt in a plane perpendicular to said equinoctial reference means and parallel to said polar axis reference means, means for preadjusting the elevation angle of the telescope sighting axis above equinoctial reference means to the known declination of any selected primary navigational body, angularly adjustable secondary star sighting means rotatably mounted on said telescope concentric with the telescope sighting axis, in a plane perpendicular to the telescope sighting axis, and angularly adjustable in radial planes extending from said sighting axis, adjusting means operable between said telescope and said secondary star sighting means for rotatably presetting the secondary star sighting axis to the known position angle between the meridian of the primary selected body indicated by the tilt plane of the telescope, and the great circle arc passing through the two bodies, measured clockwise through 360° around the primary body with respect to the tilt plane of the telescope sighting axis, adjusting means for adjusting the sighting axis of the secondary star sighting means with respect to the telescope sighting axis to the known degree of angular separation between the selected bodies to collimate the images of the primary and secondary bodies through the telescope axis, a freely gravitatable vertical reference ball dropping unit universally suspended by said portable support including releasable locking means between the ball dropping unit and the support for obtaining a fixed assumed vertical reference at, or before, the time of collimation of the images of the selected two bodies, latitude indicating means between the ball dropping unit and the support for indicating the degree of angular relation between equinoctial reference means and the assumed vertical reference position of said ball dropping unit in the assumed meridian of the observer for the time of collimation of the images of the selected bodies, local hour angle indicating means operable between the support and the ball dropping unit for indicating the angular relation between the assumed vertical of the ball dropping means and the equinoctial reference means for the time of collimation of the images of the selected bodies, in a plane transverse to the observer's meridian, said releasable locking means comprising manually releasable normally engageable adjusting means operable between the support and the ball dropping unit for positioning the latter in an assumed vertical position in the observer's assumed meridian, at his assumed latitude, and also including manually operable release means between the support and said ball dropping unit for simultaneously disengaging said adjusting means from the ball dropping unit to allow the latter to assume a freely gravitated vertical reference position at the time of collimation of the images of the bodies, and for simultaneously interlocking said latitude and local hour angle adjusting means to said ball dropping unit when said manually operable release means is disengaged, to lock said ball dropping unit in its gravitated vertical position, true vertical indicating reference means carried by said ball dropping unit, comprising ball release means disposed at the universal pivot point of the ball dropping unit for dropping balls from said pivot point, removable ball impact point recording means disposed on said ball dropping unit below said pivot point for recording the impact points of freely falling balls released from said ball release means and recording the angle between the true vertical line of fall of the balls and the assumed vertical locked reference position of the ball dropping unit, means carried by said ball dropping unit for orienting said removable ball impact point recording means to a predetermined position in said ball dropping unit with respect to the tilting plane of said telescope, and observer's position indicating means disposed in cooperative association with said ball impact recording means, having a north-south bearing line and cooperating indicating means for directly indicating the bearing direction from a point on said north-south bearing line indicating the assumed vertical reference position of the ball dropping unit relative to the ball impact point when in true vertical position, and indicating means cooperatively associated with the ball impact recording means for indicating the distance in degrees and minutes between an assumed vertical position of the axis of the ball dropping unit passing through said universal pivot point and said point on the north-south bearing line of said ball impact point recording means, and the point of impact of a ball on the ball impact point recording means, whereby the bearing and the distance in degrees and minutes of nautical miles is indicated directly between the assumed latitude and longitude position of the observer for the time of collimation of the two bodies, as indicated by the assumed vertical reference position of the ball dropping unit, and the true geographical position of the observer relative to the assumed position aforesaid, by the distance and direction between the ball dropping unit indicated vertical and recorded point of impact of freely falling ball on the impact point recording means when released by said ball release means at the time of collimation.

15. In a position finding celestial navigation instrument, an equinoctial reference support, a primary star sighting and centering telescope tiltable thereon in a perpendicular plane, adjusting means carried by said support and connected to the telescope for presetting the declination of the telescope sighting axis with respect to the equinoctial reference, to agree with the known declination of any selected navigational star, a secondary star sighting means having a sighting head journalled at the end of the telescope to rotate concentrically about the primary star sighting axis of the telescope in a plane perpendicular thereto, a secondary star sighting prism tiltably carried by said head, at one side of the primary star sighting axis, for reflecting the image of any selected secondary navigational star into a plane passing through the primary star sighting axis, a split cube prism fixedly mounted on said head, having an intermediate inclined semi-transparent reflecting surface, disposed across the primary star sighting axis of the telescope in a transverse plane passing through said secondary star sighting prism, for receiving the secondary star image and reflecting the same into collimation with the primary star image through said telescope, indexing adjusting means operatively connected between said telescope and said head for presetting the rotative adjustment of the head to position the sighting axis for said secondary star sighting means in a predetermined radial plane extending from the primary star sighting axis, measured from the tilting plane of the telescope and equal to the known position angle of the secondary star in the heavens measured between the meridian of the primary star and the location of the secondary star around the position of the primary star, indexing adjusting means operatively connected between said head and said reflecting prism for presetting the tilting adjustment of the reflecting prism, and the angular relation of the secondary star sighting axis to primary star sighting axis, to adjust the angle between the secondary sighting axis from the prism to the secondary star and the primary star sighting axis to the known degree of angular separation between the primary star and the secondary star, a local hour angle indicating disc journalled on said equinoctial reference to rotate on a fixed axis disposed perpendicular to the telescope tilt axis and perpendicular to said equinoctial reference, vertical reference member supporting means fixedly carried by said local hour angle indicating disc, a vertical reference member tiltably carried by said last mentioned supporting means for free tilting movement about a fixed axis thereon parallel to the plane of rotative adjustment of said local hour angle indicating disc and in a plane transverse to the rotative plane of the indicating disc, indexing adjusting means operatively connected between said equatorial reference support and said local hour angle indicating disc for presetting the tilt axis of the vertical reference member to dispose the plane of tilt thereof in the assumed meridian of the observer for the time of collimation of the images of the selected stars, latitude indicating indexing means operatively connected between vertical reference supporting means and the vertical reference member for presetting the tilt angle of the vertical reference member with respect to the rotative plane of the local hour angle indicating disc and said equinoctial reference to the assumed latitude of the observer where the vertical reference member will be vertical when collimating the images of the selected stars whereby the primary star may be located through the telescope and the instrument rotated about the said primary star sighting axis at the observer's assumed geographical position, to bring said secondary star sighting axis into alignment with the secondary star, any angular variation between the vertical position of the vertical reference member and the true vertical at the observer's true geographical position indicating the bearing-direction between the assumed and true geographical positions of the observer and the degree of said variation in minutes of arc between the vertical position of the vertical reference member at the observer's assumed position and the true vertical at the observer's position indicates the distance in nautical miles between the observer's assumed and true position, and manually operable gravity operated true vertical reference recording means carried by said vertical reference member for recording variations between the assumed vertical position of the vertical reference member and the true vertical, comprising bearing-direction and angular variation indicating means for indicating said bearing-direction and angular distance in degrees between the true vertical and the "vertical" position assumed by the vertical reference member at the time of collimation of the images of the selected stars.

16. In a preset celestial navigation instrument having an equinoctial and polar axis reference support and primary and secondary star sighting means thereon, adjusting means on the support for adjusting the primary star sighting axis in a plane transverse to the equinoctial reference support, to the declination of a selected primary star, means on the primary star sighting means for rotating and angularly adjusting the secondary star sighting axis to position the same with respect to the adjustment plane of the primary star sighting means, at the position angle between the meridian of the primary star and the position of the secondary star measured clockwise through 360° around the primary star, and to the separation angle between the two selected stars, a universally tiltable gravity operated vertical reference member carried by said equinoctial and polar axis reference support for tilting movements in intersecting transverse planes respectively parallel and perpendicular to the tilt plane of the primary star sighting means, whereby the position of the primary selected star may be located through the primary star sighting means and the instrument revolved around the primary star sighting axis to locate the secondary star and collimate the image of the secondary star with the image of the primary star to position the equinoctial reference parallel to the celestial equator and perpendicular to the polar axis of the celestial sphere with the gravity vertical reference member in a substantially vertical reference position at the geographical location of the observer while sighting the selected stars, local hour angle position indicating means between said equinoctial reference support and said gravity operated vertical reference member for indicating variations in degree of arc between the tilt plane of the primary star sighting means and the vertical assumed by the gravity operated vertical reference member, latitude indicating indicia between said gravity operated vertical reference member and said equinoctial reference support for indicating variations in degrees of arc between the plane of the equinoctial reference and the vertical assumed by said gravity operated vertical reference member, manually releasable locking means between the support and said gravity operated vertical reference member for locking said gravity operated vertical reference member in an assumed vertical position at the location of the observer while collimating the image of the secondary star with the image of the primary star, removable true vertical recording reference means carried by said vertical reference member in predetermined oriented relation thereto, for recording thereon the angular variations in degrees and minutes of arc and the direction of the variation between the assumed vertical of the gravity operated vertical reference member, when locked to said equinoctial reference support by said releasable locking means, and the true vertical at the time of collimation of the images of the selected stars, including direction and distance in degrees of arc indicating means operatively associated with said recording means having north-south, east and west intersecting bearing lines passing through the center of the vertical recording means where the vertical axis of the gravity operated vertical reference member is located while the recording means is oriented therein, for indicating the recorded angular distance in degrees of arc between said indicated vertical axis of the gravity operated vertical reference member at the intersection of the said north-south, east-west bearing lines and the relatively angular position of said recorded true vertical axis on the removable recording means, to indicate the distance in degrees of arc and nautical miles between the true vertical at the geographical position of the observer as indicated and the vertical assumed by the gravity operated vertical reference member, and for indicating the bearing-direction between the north-south bearing line from the assumed vertical axis to the recorded true vertical position on said removable recording means.

17. In a celestial navigation instrument a portable support having an equinoctial reference position, primary star sighting telescope means tiltably and removably carried by said support at one side thereof to tilt about an axis perpendicular to said equinoctial reference position of the support, declination angle adjusting means operatively connected between the support and telescope means for selectively adjusting the sighting axis thereof, with respect to the equinoctial reference position of the support, to the declination angle of any selected navigational star, a secondary star sighting means, a rotary support therefor rotatably mounted at the outer end of said telescope means to turn concentrically about the sighting axis of the telescope in a plane perpendicular thereto, said secondary star sighting means comprising a split cube collimating prism fixed on said rotary support in the telescope sighting axis, having an intermediate semi-transparent reflecting surface disposed in the telescope sighting axis in 45° inclined relation to said axis, a right angle reflecting prism tiltably carried by said rotary support at one side of the telescope sighting axis in a plane through said sighting axis and in a second intersecting plane extending through said inclined semi-reflecting surface of the split cube prism at right angles to the telescope sighting axis, reflecting prism indexing adjusting means operatively connected between saiad rotary support and the right angle reflecting prism for tilting the same on said rotary support, in a plane extending through the telescope sighting axis, said split cube prism and said reflecting prism, to adjust the angular relation between the telescope sighting axis and the secondary star sighting axis to an angle equal to the separation angle between the selected primary star and any selected secondary star within an approximate 90° separation angle, indexing adjusting means operatively connected between the telescope means and said rotary support for rotatably adjusting the last mentioned support to dispose the tilting plane of said tiltable reflecting prism and secondary star sighting axis, with respect to the tilting plane of the telescope means, and the primary star sighting axis, at a position angle equal to the position angle between the selected secondary and primary stars, measured clockwise through 360° around the primary selected star from its meridian to the secondary star, whereby the relation between the position of any selected primary and secondary stars may be preset in the instrument with respect to the equinoctial reference position of the support and the meridian of the primary star, enabling a direct sighting of the primary star through the telescope, and rotation of the instrument around the primary star sighting axis to bring the secondary star image into collimation with the primary star image in only one position, when the equinoctial reference position of the portable support is disposed parallel with the celestial equator and at right angles to the polar axis of the celestial sphere, a vertical reference pendulum member universally suspended from said portable support to assume a vertical position while collimating the images of said selected stars and having a vertical indicating axis, indexing local hour angle position indicating means operable between said vertical reference pendulum member and the portable support for indicating angular variations between the meridian of the selected primary star and the observer's meridian when said vertical reference member is in vertical position in a plane transverse to the observer's meridian, latitude indexing indicating means operable between said portable support and vertical reference member for directly indicating the latitude of the observer when collimating the images of the selected stars, when the vertical reference member is disposed in vertical position in the meridian of the observer, manually actuatable simultaneously operable locking means operable between the portable support and said vertical reference member for locking the same in an assumed vertical position during collimation of the images of the selected stars, a prime vertical reference target plate removably mounted on said vertical reference member below its suspension point, having a central point disposed in the vertical reference axis of the vertical reference member and passing through the universal suspension point, indicating the vertical reference axis of the vertical reference member, manually operable ball holding and release means fixedly carried by said vertical reference member at its suspension point for releasing and dropping balls from said suspension point onto said target plate, means intermediate said ball release means and said target plate for recording the impact points of the balls on said target plate with respect to said central point, means for holding said target plate in said vertical reference member in predetermined oriented relation to said vertical reference member, said target plate, having a bearing line indication thereon extending through said central point of the target plate for indicating the bearing angle between the said bearing line on the target plate and a line through the recorded ball impact point position on the target plate and the center of the plate, and means for recording the vertical angle in degrees between the vertical reference axis of the vertical reference member and the vertical line of fall of the balls from said ball holding release means, to determine the distance in degrees and nautical miles between the assumed geographical position of the observer during the collimation of the selected star images, with the vertical reference locked in an assumed vertical position and the true geographical position of the observer as indicated by the arc and direction of displacement of the ball impact points on the target plate from the said center of the target plate.

18. In a celestial navigation instrument of the class described, a support having an equinoctial reference plane, primary star sighting means having a primary star sighting axis including an objective lens of a predetermined focal length, adjustably carried on said support to dispose the primary star sighting axis of the objective lens at an angle from said equinoctial reference plane equal to the declination of any selected primary navigational star, secondary star sighting means carried by primary sighting means, rotatable about said primary sighting axis in a plane perpendicular thereto and including a semi-transparent reflector inclined across said sighting axis, and a laterally offset reflector tiltable on an axis perpendicular to the primary star sighting axis to determine a secondary star sighting axis, adjusting means for adjusting the tilting plane of said tiltable reflector to dispose the tilting plane of the secondary star sighting axis at the position angle between the meridian of the primary star and the position of any selected secondary star measured around the primary body from its meridian and the tilting plane of the primary star sighting axis on the support, means for adjusting the reflecting angle of said tiltable reflector to dispose the secondary star sighting axis which extends from the tiltable reflector to the selected secondary star, at an angle from the primary star sighting axis equal to the separation angle between the primary and secondary selected stars, an objective lens in said secondary star sighting axis, between the tiltable reflector and the fixed semi-transparent reflector having a predetermined focal length different from the focal length of the objective lens in the primary star sighting axis, whereby the images of the primary and secondary stars may be sighted and collimated through said objective lenses of different focal lengths, in the primary star sighting axis, in a single or common eye-piece, and gravity operated vertical reference means carried by the support for determining a true vertical reference at the observer's position, while collimating the images of the selected stars.

19. In a two star image collimating navigational instrument, a portable support having an equinoctial reference, a primary direct star sighting and centering objective lens system and eye-piece adjustable on said support, in a plane transverse to said equinoctial reference, for determining a primary direct star sighting axis in the meridian of any selected primary star, means for adjusting the tilt angle of said primary direct star sighting and centering objective lens system to dispose the primary direct star sighting axis, at an angle from said equinoctial reference, equal to the known declination of any selected navigational body, secondary star sighting means including an adjustable support rotatable in front of the aforesaid objective lens system in a plane perpendicular to the direct sighting axis, having fixed semi-transparent reflecting means inclined across said direct sighting axis, and laterally offset reflecting means, tiltable on an axis perpendicular to the direct sighting axis, for reflecting the image of any selected secondary navigational body, in the tilting plane of said laterally offset reflecting means, through said direct sighting axis at the intersection thereof with said fixed inclined semi-transparent reflecting means, whereby the image of the secondary body may be collimated with the image of the primary body in said direct sighting axis, adjusting means for adjusting the rotative position of the rotary support to dispose the tilting plane of said tiltable reflector at an angle, with respect to the adjustment plane of said primary direct star sighting axis on said portable support, equal to the known position angle between the meridian of the primary selected body and the position of the selected secondary body in the heavens, measured clockwise around the primary body to the position of the secondary body, means for adjusting the tilting angle of the tiltable reflector to position the secondary star sighting axis from the tiltable reflector to the secondary body, with respect to the primary direct star sighting axis, to known separation angle between the selected primary and secondary bodies, a vertical reference member universally suspended from said support for obtaining a recorded vertical reference at the observer's geographical position, at or, for the time of the observation, to record the local hour angle between the observer's meridian and the meridian of the selected primary body indicated by the tilting plane of the primary direct star sighting axis, and to record the angle between the equinoctial reference position of the support and the vertical in the meridian of the primary body, to indicate the latitude of the observer, at or, for the time of observation, said vertical reference member having ball dropping means therein for selectively releasing balls at the universal suspension center of the vertical reference member for free fall through said vertical reference member, ball impact recording means removably inserted in the lower end of said vertical reference member in predetermined oriented relation thereto, having a ball impact point recording surface thereon disposed perpendicular to the line of fall of the released balls, with said vertical reference member in vertical position, said ball impact recording means having a true vertical ball impact recording point thereon coincident with the true vertical determining axis of the vertical reference member, concentric distance indicating circles on said recording surface, with the last mentioned vertical ball impact reference point as a center, each circle having a radius from said vertical ball impact reference point equal to the arc which subtends the angle between the vertical axis of the vertical reference member and a line between the universal suspension point of the vertical reference member and the respective circle, said distance indicating means for each circle for indicating the angle aforesaid in terms of minutes of arc between the true vertical reference point on the recording surface and the circle, with the ball release point as a center, whereby collimation of the images of the stars may be made with the vertical reference member in true vertical position for the assumed geographical location of the observer and the true vertical for the true geographical position of the observer is indicated by the angular relation between the vertical line of fall of the released balls indicated by the mean impact pattern of balls on said recording surface and the vertical reference axis of the vertical reference member determined by the center of the circles, measured in terms of minutes of arc, indicating the distance in minutes, or nautical miles between the assumed and true geographical positions aforesaid, and the offset relation of the ball impact pattern with respect to the bearing direction lines on said recording surface determines the direction of the observer's geographical position from his assumed position.

20. Apparatus as claimed in claim 19, including magnifying means carried by said insertable ball impact point recording means for obtaining a magnified image of said ball impact pattern recording surface of said ball impact recording means.

21. Apparatus as claimed in claim 19, in which said ball impact point recording means comprises a hollow insertable body, oriented relative to the vertical reference member, having a transparent ball impact receiving end with the distance circles and bearing direction lines inscribed on said end, and a magnifying objective in the other end of the hollow body having an axis perpendicular to the ball impact receiving end, for reading the indicated position of the ball impact point pattern thereon through said transparent end with relation to the distance circles and bearing lines.

22. Apparatus as claimed in claim 10, wherein the gravity operated vertical reference means comprises a gravity pendulum ball dropping unit having manually operable ball release means therein for selectively dropping balls from the universal tilting center of the ball dropping unit, and includes removable ball impact point recording means carried by said ball dropping unit in predetermined spaced relation below said ball release means for recording the point of impact of said balls dropped thereon by said ball release means, together with orienting means between said ball impact point recording means and the ball dropping unit for orienting the ball impact point recording means with respect to the oriented position of the ball dropping unit, including calibrated indicator means on the ball impact point recording means for indicating any deviation and the direction and degree of such deviation at the time of collimation of the images of the two bodies, between the vertical pendulum position assumed by said ball dropping unit and the vertical free fall direction of the balls released by the ball release means of the ball dropping unit as indicated by the point of impact of said balls recorded on said impact recording means, said calibrated indicator means including scale means for indicating the true bearing direction and distance between the assumed geographical position of the observer where the first mentioned vertical reference would be vertical while collimating the images of the bodies, and the true geographical position of the observer during the collimation of the images of the bodies, recorded by the impact point of the balls on said impact receiving means relative to the assumed vertical axis of the ball dropping unit.

23. In a celestial navigation instrument for aircraft, primary star sighting telescope means having a sighting axis, secondary star sighting means adjustably mounted relative to the primary star sighting telescope means for sighting a secondary star therethrough in coincident relation with the sighting axis while sighting a primary star directly through the primary star sighting telescope means, primary vertical reference means adjustable in perpendicular intersecting planes respectively parallel and perpendicular to the sighting axis of the primary star sighting telescope means, secondary true vertical reference means fixed relative to the primary vertical reference means including means for indicating the true vertical and the angular distance and direction between said primary vertical reference means, when set for an assumed vertical position at a predetermined geographical position at a predetermined future time where the primary vertical reference means would be vertical while sighting the primary and secondary stars, and the true vertical indicated by the vertical reference indicating means at the true geographical position of the observer at the said future time while sighting the primary and secondary stars through said primary star sighting telescope means and the secondary star sighting means, adjusting means operatively connected between the primary vertical reference means and the primary star sighting telescope means for the aforesaid relative adjustments thereof, whereby while flying directly from a known geographical position beginning at a known time, toward the said assumed geographical position in still air at a known speed sufficient to bring the observer to the aforesaid predetermined geographical position at said predetermined time, the indicated angular distance between the primary and secondary vertical reference means indicates rate of wind speed for the elapsed time period and the direction of the relative displacement between said primary vertical reference means and secondary true vertical reference means indicates the average wind direction throughout the elapsed time period.

JOHN C. CABLE.

REFERENCES CITED

The following references are of record in the file of this patent:

UNITED STATES PATENTS

| Number | Name | Date |
|---|---|---|
| 1,512,601 | Hoar | Oct. 21, 1924 |
| 2,316,466 | Storer | Apr. 13, 1943 |

FOREIGN PATENTS

| Number | Country | Date |
|---|---|---|
| 105,371 | Great Britain | Apr. 5, 1917 |
| 567,379 | France | Dec. 5, 1923 |